US012045738B2

(12) United States Patent
Sabella et al.

(10) Patent No.: US 12,045,738 B2
(45) Date of Patent: Jul. 23, 2024

(54) TRANSPORTATION OPERATOR COLLABORATION SYSTEM

(71) Applicant: Intel Corporation, Santa Clara, CA (US)

(72) Inventors: Dario Sabella, Munich (DE); Miltiadis Filippou, Munich (DE); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 17/132,469

(22) Filed: Dec. 23, 2020

(65) Prior Publication Data

US 2021/0112441 A1 Apr. 15, 2021

(51) Int. Cl.
*G06N 5/04* (2023.01)
*G06N 20/00* (2019.01)
*H04W 28/02* (2009.01)

(52) U.S. Cl.
CPC .............. *G06N 5/04* (2013.01); *G06N 20/00* (2019.01); *H04W 28/0226* (2013.01)

(58) Field of Classification Search
CPC ............ G06N 5/04; G06N 20/00; G06N 3/08; H04W 28/0226; H04W 4/38; H04W 4/40; H04W 40/18; H04W 24/10; H04W 84/042; H04W 24/04; H04W 4/20; H04W 24/06; H04W 28/24; G06Q 10/04; G06Q 10/067; G06Q 50/10
See application file for complete search history.

(56) References Cited

U.S. PATENT DOCUMENTS

2021/0014157 A1* 1/2021 Zhou ................... H04L 43/0817
2021/0127299 A1* 4/2021 Vakeesar ........... H04W 36/0044
(Continued)

FOREIGN PATENT DOCUMENTS

WO 2020227435 11/2020

OTHER PUBLICATIONS

"ETSI GS MEC 030 V2.1.1", Multi-access Edge Computing (MEC); V2X Information Service API, (Apr. 2020), 59 pgs.
(Continued)

*Primary Examiner* — Tejis Daya
(74) *Attorney, Agent, or Firm* — Schwegman Lundberg & Woessner, P.A.

(57) ABSTRACT

Methods, systems, and computer programs are presented for sharing information among multiple Mobility as a Service (MaaS) systems for presenting service information to users. One system includes means for receiving, by a multi-access edge computing (MEC) application, parameters of a global quality of service (QoS) prediction model, and means for sending, to a local prediction function (PF), an update of a local QoS prediction model. Further, the system includes means for detecting a journey of a vehicle requested by a user, and means for sending to the local PF, a request for a value of the QoS along the journey. The value of the QoS is a measure of quality of transportation services delivered during the journey. The system further includes means for receiving the predicted value of the QoS along the journey, and means for providing, by the MEC application, the predicted value of the QoS to the vehicle.

21 Claims, 18 Drawing Sheets

(56) References Cited

U.S. PATENT DOCUMENTS

2021/0258818 A1* 8/2021 Jung .................. H04W 28/0268
2021/0274387 A1* 9/2021 Kousaridas ........... H04L 43/091

OTHER PUBLICATIONS

"Making 5G Proactive and Predictive for the Automotive Industry", 5GAA Automotive Association, (2019), 26 pgs.

"Operator Platform Telco Edge Proposal", Version 1.0, (Oct. 22, 2020), 64 pgs.

"Telco Edge Cloud: Edge Service Description and Commercial Principles Whitepaper", Future Networks, (Oct. 27, 2020), 5 pgs.

"Federated Learning", Ekkono Solutions, (May 2020), 7 pgs.

"Ekkono Solutions", Akraino, (2020), 3 pgs.

"Toward fully connected vehicles: Edge computing for advanced automotive communications", 5GAA Automotive Association, (Dec. 2017), 19 pgs.

"System Architecture and Solution Development; High Accuracy Positioning for C-V2X", 5GAA Automotive Association;, (2021), 56 pgs.

"Edge Computing Market Worth $43.4 Billion by 2027 | CAGR: 37.4%", https: web.archive.org web 20201109205533 https: www.grandviewresearch.com press-release global-edge-computing-market, (Mar. 2020), 5 pgs.

Li, Tian, "Federated Learning: Challenges, Methods, and Future Directions", (Aug. 21, 2019), 21 pgs.

"European Application Serial No. 21213506.5, Extended European Search Report mailed Feb. 28, 2022", 8 pgs.

* cited by examiner

TRANSPORTATION OPERATOR COLLABORATION SYSTEM

TECHNICAL FIELD

The subject matter disclosed herein generally relates to methods, systems, and machine-readable storage media for improving transportation services in a multi-provider environment.

BACKGROUND

Mobility as a Service (MaaS) operators may have contracts with different transportation service providers (TSPs), including public and private entities, to provide transport services within a certain region. The servicing area can be large, even across country borders, which makes it difficult for a single MaaS operator to satisfy all the mobility requirements of all subscribers. Further, the transportation modes offered by each MaaS operator may also differ. Hence, cooperation among MaaS operators, for expanding the coverage of their services and improving business opportunities and customer satisfaction, becomes a challenging proposition to optimize services for users and revenue opportunities.

Initial implementations of MaaS have shown that sharing data to create a more integrated user experience can result in benefits for all parties. For example, Uber® users can book tickets on regional train services, which results in increases in train ridership and Uber rides starting or ending at train stations.

However, today, most TSPs lack the ability to collaborate with other TSPs. Further, when TSPs want to collaborate, it is difficult to exchange information as their Information Technology (IT) systems may utilize different programs, interfaces, databases, etc. This hinders the ability to determine optimal routing services and maximize user satisfaction.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to sharing information among multiple Mobility as a Service (MaaS) systems for presenting service information to users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an interoperable framework is presented, including hardware and software components in vehicles and in the cloud edge, that permits the creation of a digital twin of the system that enables the generation of a coverage map for end-users. The coverage map is built dynamically and collaboratively, based on the securely aggregated information from elements of a federated learning system (e.g., vehicles, applications in user devices, Roadside Units (RSUs), edge cloud infrastructure). The coverage map may be presented in a specialized Human/Machine Interface (HMI) available in the vehicle, which includes presenting the expected availability of certain Vehicle-to-Everything (V2X) features, which is tracked and updated over time. The solution is designed to enable interoperable MaaS services in heterogeneous V2X scenarios, by using standardized interfaces and messages.

One system includes means for receiving, by a multi-access edge computing (MEC) application, parameters of a global quality of service (QoS) prediction model, and means for sending, to a local prediction function (PF), an update of a local QoS prediction model. Further, the system includes means for detecting a journey of a vehicle requested by a user, and means for sending to the local PF, a request for a value of the QoS along the journey. The value of the QoS is a measure of quality of transportation services delivered during the journey. The system further includes means for receiving the predicted value of the QoS along the journey, and means for providing, by the MEC application, the predicted value of the QoS to the vehicle.

Figure 1:
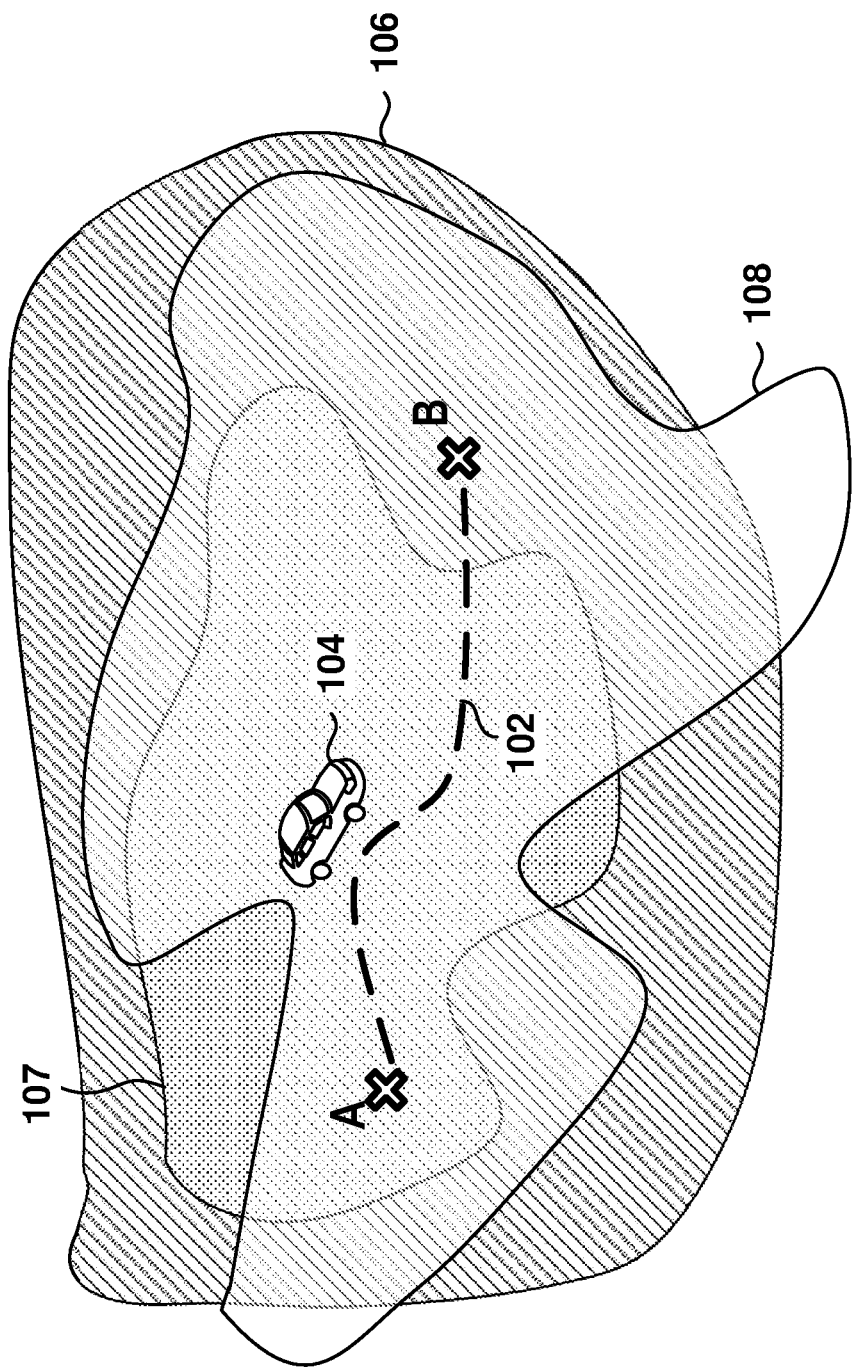
FIG. 1 illustrates a Mobility as a Service (MaaS) scenario with multiple Transportation Service Providers (TSP) and graphical indicators of the level of support of certain services ("service coverage maps") in space and in time.

FIG. 1 illustrates a Mobility as a Service (MaaS) scenario with multiple Transportation Service Providers (TSP) and graphical indicators of the level of support of certain services ("service coverage maps") in space and in time. Mobility as a Service (MaaS) is the integration of various forms of transport services into a single mobility service accessible on demand. To meet a customer's request, a MaaS operator facilitates a diverse menu of transport options, which may be any combination of public transport, ride-sharing, car-sharing, bike-sharing, taxi, car rental, etc. Each operator may offer services in different areas, such as areas 106-108. For example, a vehicle 104 going from point A to point B may use a route that includes services from area 107 and area 108 along a route 102.

For the user, MaaS offers added value through use of a single application to provide access to mobility, with a single payment channel instead of multiple ticketing and payment operations. MaaS help users with their mobility needs and solve the inconvenient parts of individual journeys as well as the entire system of mobility services.

A successful MaaS service brings new business models and ways to organize and operate the various transport options, with benefits for transport operators including access to improved user and demand information and new opportunities to serve unmet demand. The aim of MaaS is to provide an alternative to the use of the private cars that is convenient, sustainable, reduces congestion, and sometimes cheaper.

Providing users with a seamless mobility experience with reduced operational cost involves collection, aggregation, and sharing of data from various entities. For example, historical data about user preferences and trips can be collected from the MaaS User Application during trip initiation, selection, journey, and trip completion. Similarly, TSPs have data about user demands, congestion on the road, environment, charging conditions, etc., through the sensors of their vehicles. MaaS operators also may have agreements with network service providers, which have useful data regarding people mobility patterns for various geographic areas and times of day. Sharing such data fragments among the MaaS operators will be mutually beneficial, e.g., providing users with better experiences (e.g., zero wait time, no coverage hole) and maintaining a healthy fleet.

Figure 2:
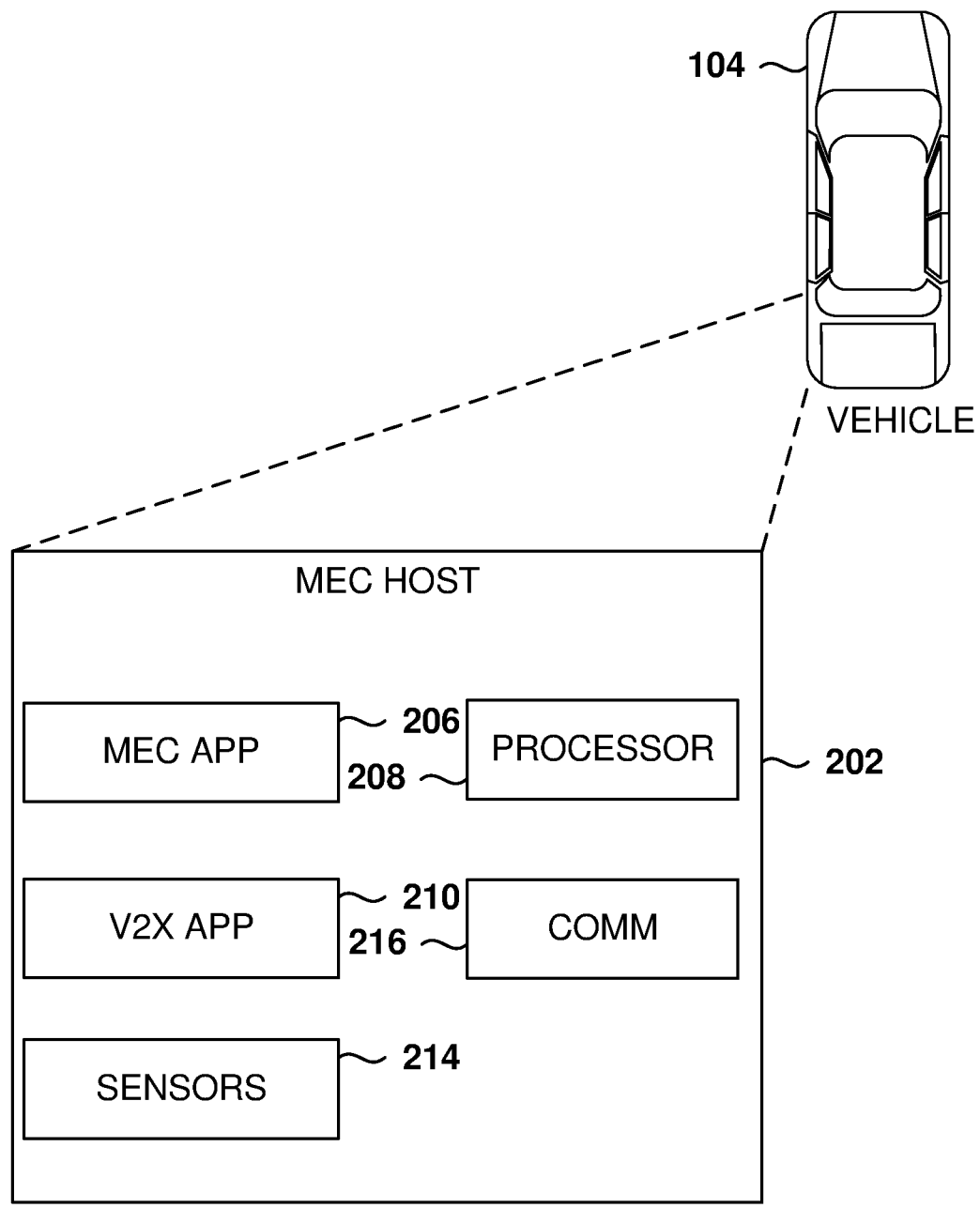
FIG. 2 is a schematic drawing illustrating a system to control a vehicle, according to some example embodiments.

FIG. 2 is a schematic drawing illustrating a system to control a vehicle 104, according to an embodiment. FIG. 2 includes a EC host 202 incorporated into the vehicle 104.

The vehicle 104 may be any type of vehicle, such as a commercial vehicle, a consumer vehicle, a recreation vehicle, a car, a truck, a motorcycle, or a boat, able to operate at least partially in an autonomous mode. The vehicle 104 may operate at times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

In some example embodiments, the MEC host 202 includes a Multi-access Edge Computing (MEC) application 206, a processor 208, a V2X application 210, sensors 214, and a communications module 216.

The MEC application 206 and the V2X application 210 may execute on processor 208 and provide the functionality described in more detail below. MEC is a technology that allows applications to be instantiated at the edge of an access network and provides a low-latency and a close-proximity environment to user equipment (UE). As a result, vertical industries, such as the automotive industry, are expected to significantly benefit from the deployment of MEC infrastructure together with the deployment of Radio Access Networks (RANs).

The sensors 214 may include various forward, side, and rearward facing cameras, radar, Light Detection and Ranging (LIDAR), ultrasonic, or similar sensors. The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

The communications module 216 may utilize a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

Figure 3:
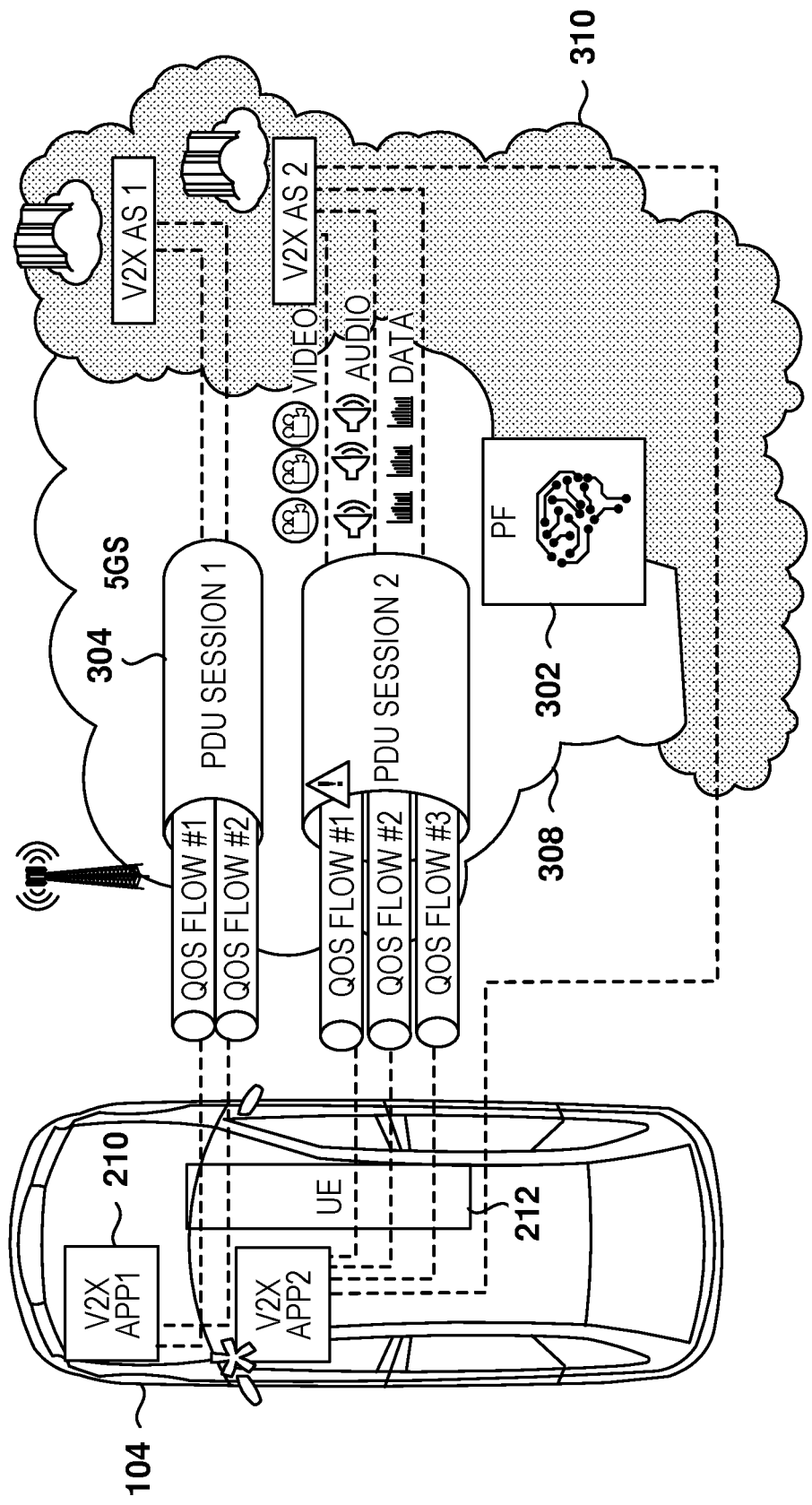
FIG. 3 illustrates an architecture for implementing predictive Quality of Service (QoS), according to some example embodiments.

FIG. 3 illustrates an architecture for implementing predictive Quality of Service (QoS), according to some example embodiments. The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

QoS measures the quality of transportation services delivered to users, which includes several factors, such as availability of resources for making a trip, estimated time to complete the trip, traffic congestion affecting a trip, availability of network connectivity (e.g., for the user, for the vehicle), etc. In some example embodiments, the QoS is measured by one or more numerical values (e.g., a number, a vector), and thresholds are established to determine when the value of the QoS is below one or more thresholds, which indicates deterioration in the quality of the delivery, and will trigger responses for the system to improve the QoS for one or more users.

The Vehicle-to-Everything (V2X) applications 210 include different types of communications, such as Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). The V2X applications 210 can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

The 5G Automotive Association (5GAA) addressed the feature of predictive Quality of Service (PQoS), which is a mechanism enabling mobile networks (e.g., 308, 310) to provide advance notifications about P-QoS changes to interested consumers. In ETSI Multi-access Edge Computing Industry Specification Group (ETSI MEC ISG), a standardized API (MEC V2X API) in the edge cloud can help in delivering P-QoS information to consuming apps, in Multi-MNO, Multi-vendor, Multi-OEM scenarios.

The connectivity service provided by the mobile network to the vehicle is represented by a Protocol Data Unit (PDU) session 304. The PDU session 304 contains one or more QoS flows. The IQN consumer is the entity that requests IQNs and uses the information within the IQN to adapt the behavior of the vehicle and the application accordingly—for example, V2X application 210, V2X application server 312. A Prediction Function (PF) 302 collects necessary information, such as statistics including network, vehicle, and third-party data, to generate predictions, e.g., using machine-learning models. FIG. 3 shows an example of a vehicle running two applications using predictive QoS.

One such V2X application 210 includes Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels.

Communications in ITS may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

In some example embodiments, PFs 302 are deployed at the network and/or road infrastructure side. The PFs 302 may be Machine Learning (ML) model(s)/algorithm(s) and/or Artificial Intelligence (AI) agents implemented, for example, by a Deep Neural Network (DNN), and/or some other ML/AI algorithm, such as those discussed herein. The role of the PF 302 is to generate predictions of Quality-of-Service (QoS) to be experienced by, for example, Teleoperated Driving applications, V2X applications, and the like.

Predictive QoS is a mechanism that enables a network to provide notifications about predicted QoS changes to interested users in order to adjust the application behavior in advance. Such prior notifications, whenever predictions are made with sufficient confidence, may be delivered with a notice period before the new predicted QoS is experienced. The notice period depends on the specific application and use case and should be long enough to give the application sufficient time to adapt to the new predicted QoS. The messages carrying such information are called In-advance QoS Notifications (IQN), which are received by connected vehicles, thus enabling V2X applications to take appropriate action prior to the predicted QoS change taking. For example, predicted QoS enables applications for remote and autonomous driving to adjust to the changing conditions in the environment.

Further, edge computing refers to the implementation, coordination, and use of computing and resources at locations closer to the "edge" or collection of "edges" of the network, where the edge refers to the parts of the network close to the users. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high-performance computing data center or cloud installation; a designated edge node server, an enterprise server, a roadside server, a telecom central office; or a local or peer at-the-edge device being served consuming edge services).

Figure 4:
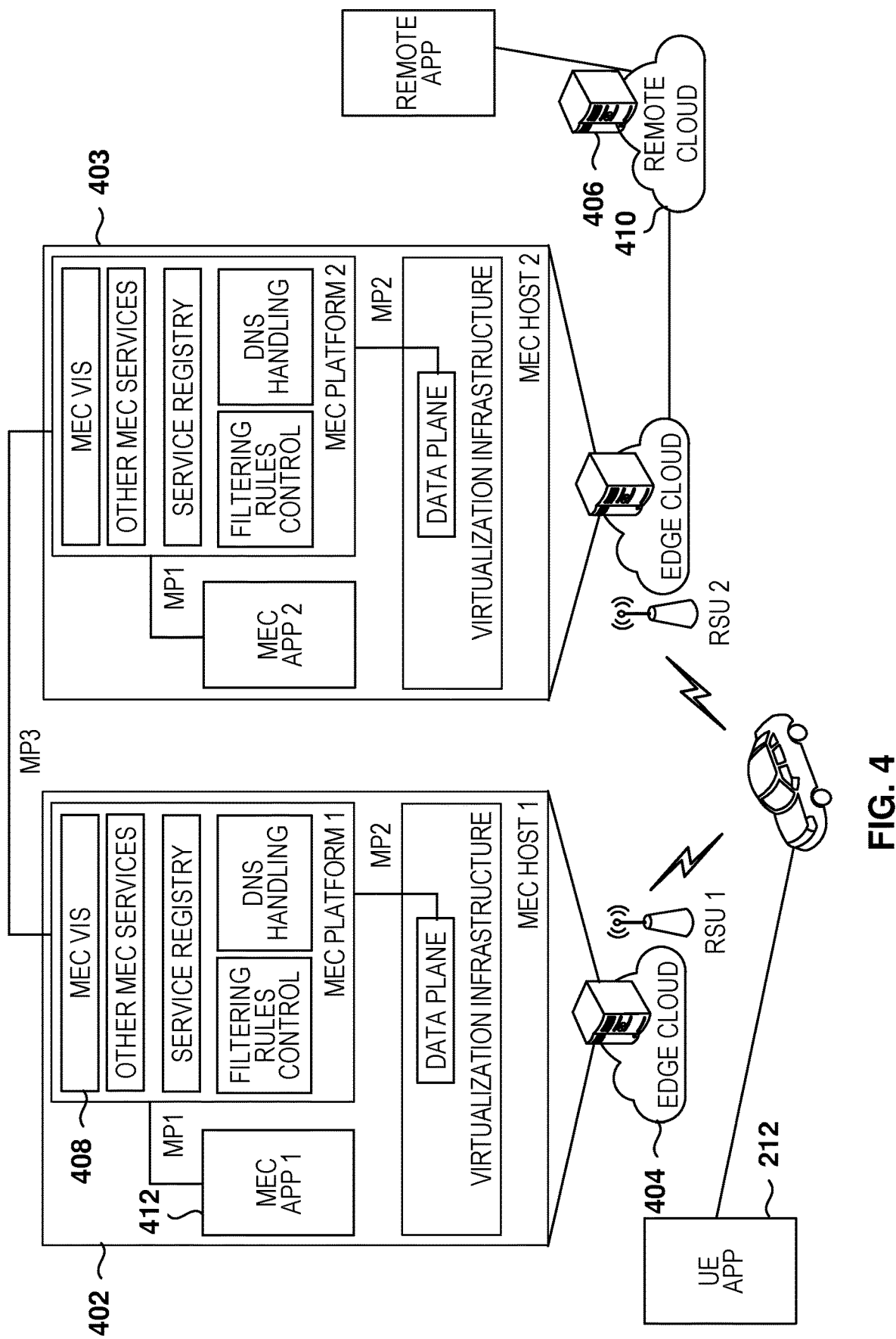
FIG. 4 illustrates an example Multi-access Edge Computing (MEC) system architecture for providing Vehicle-to-Everything (V2X) applications, according to various embodiments.

FIG. 4 illustrates an example MEC system architecture for providing V2X applications, according to various embodiments. The V2X applications may include different types of communication, such as Vehicle-to-Vehicle (V2V), Vehicle-to-Infrastructure (V2I), Vehicle-to-Network (V2N), and Vehicle-to-Pedestrian (V2P) communications.

V2X applications can use co-operative awareness to provide more intelligent services for end-users. This means that entities, such as vehicle stations or vehicle user equipment (VUEs), also referred to herein simply as UE, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like. V2X applications utilize an underlying access technology or radio access technology (RAT) to convey messages for co-operative awareness. These RATs may include, for example, IEEE 802.11p based protocols such as DSRC and ITS-G5, 3GPP cellular-based protocols such as 5G-V2X and/or LTE-V2X protocols. Although the embodiments herein are discussed in the context of automotive vehicles, the embodiments may also apply to other types of vehicles including aircraft, watercraft, and/or the like.

MEC offers application developers and content providers cloud-computing capabilities and an IT service environment at the edge of the network. This environment is characterized by ultra-low latency and high bandwidth as well as real-time access to radio network information that can be leveraged by applications. MEC technology permits flexible and rapid deployment of innovative applications and services towards mobile subscribers, enterprises and vertical segments. In particular, regarding the automotive sector, applications such as MEC applications 412 need to exchange data, provide data to aggregation points and access data in databases which provide an overview of the local situation derived from a multitude of sensors (by various cars, roadside units, etc.).

The V2X system involves multiple MEC hosts 402, 403 and the use of the MEC V2X Information Service (VIS) 408. Each of the MEC hosts 402, 402 may be part of the edge cloud 404, and the remote cloud 410 may include one or more remote application servers 406.

In various embodiments, the MEC system may support the feature V2Xservice. When the MEC system supports the feature V2XService, the MEC system includes the capability to provide feedback information from the network in support of V2X functions, which helps with predicting whether a communication channel is currently reliable or not (e.g., in terms of fulfilling latency requirements and/or a threshold packet arrival).

The MEC system supporting V2XService includes the capability to provide quality related information from the network to the vehicle about when the various connectivity parameters (like latency, PER, signal strength, etc.) are going to change. The MEC system supporting V2XService includes the capability to provide interoperability by supporting V2X information exchange among road users connected through different access technologies, networks, and/or MNOs. The MEC system supporting V2XService enables multi-operator operation for V2X stations/equipment to provide service continuity across access network coverage nationwide and across borders of different operators' networks, and includes the capability to provide interoperability in multi-operator scenarios, enabling MEC apps 412 in different systems to communicate securely with each other, in order to enable synchronization in multi-operator systems also in absence of cellular coverage (outside of 3GPP domain).

In presence of multiple MEC hosts 402, 403, the MEC VIS 408 permits exposure of information between MEC apps 412 running on different MEC hosts 402, 403. Each of the MEC hosts 402, 403 can be owned/managed by a different operator or service provider (e.g., a MEC vendor or a third party). MEC apps 412 instantiated on MEC hosts 402 and 403 can be used to provide V2X-related services, and can be operated by the mobile services operator, by a MEC vendor, or by a third party (e.g., OEM, or OEM supplier, or system integrator). In addition, other remote application server instances can be located elsewhere, such as in remote cloud 410. Remote cloud 410 may be any type of cloud infrastructure, for example, one or more private clouds owned by an operator or by an OEM. The remote cloud 410 also operates one or more remote apps. The VIS 408 may be produced by the MEC platform or by the MEC app 412.

In some aspects, the MEC platform can include a MEC V2X API that provides access to MEC VIS 408 information, configuration, and commands. The MEC V2X API supports both queries and subscriptions (e.g., pub/sub mechanism) that are used over a Representational State Transfer ("REST" or "RESTful") API or over alternative transports such as a message bus. For RESTful architectural style, HTTP protocol bindings may be defined for the MEC V2X API. In particular, the MEC VIS 408 permits information exposure, pertinent to the support of automotive use cases, to MEC app 412 instances. The VIS 408 also permits a single ITS operator to offer V2X applications/services over a region that may span different countries and involve multiple network operators, MEC systems, and MEC app providers. For that purpose, the VIS 408 can include the following functionalities: (a) gathering of PC5 V2X relevant information from the 3GPP network for purposes of performing UE authorization for V2X communications (e.g., obtaining a list of V2X authorized UEs, obtaining relevant information about the authorization based on UE subscription, and obtaining V2X configuration parameters such as a common set of V2X configuration parameters which can include PC5 configuration parameters); (b) exposure of the information obtained in (a) to MEC apps in the same MEC host or MEC apps in other MEC hosts; (c) enablement of MEC apps to communicate securely with the V2X-related 3GPP core network logical functions (e.g., enabling communication between a MEC host and a V2X control function in the core network); (d) enablement of MEC apps in different MEC systems to communicate securely with each other; and (e) gathering and processing information available in other MEC hosts/systems using suitable MEC V2X APIs (e.g., gathering and processing information obtained via the MEC V2X API (see e.g., ETSI MEC GS 030 v2.1.1 (2020-04) (hereinafter "[2]")), Radio Network Information (RNI) API (see e.g., ETSI GS MEC 012 V1.1.1 (2017-07) ("[R09]")), Location API [R10], UE Identity (UE ID) API [R11], Bandwidth Management (BWM) API [R12], WLAN Access Information (WAI) API, Fixed Access Information (FAI) API ETSI GS MEC 029 v2.1.1 (2019-07) ("[R13]"), and other like APIs for accessing other MEC services that may be implemented within the MEC platform) in order to predict radio network congestion, and provide suitable notifications to the ITS-S.

The MEC V2X API provides information to MEC apps 412 in a standardized way, which provides interoperability in multi-vendor scenarios. Nevertheless, MEC apps 412 may communicate in a direct way (e.g., without the use of MEC platform). In some embodiments, inter-system communication may be realized between MEC Orchestrators (MEOs). Additionally, possible Mp3 enhancements (or new reference points between MEC systems) may be defined for MEC app communication.

Figure 5:
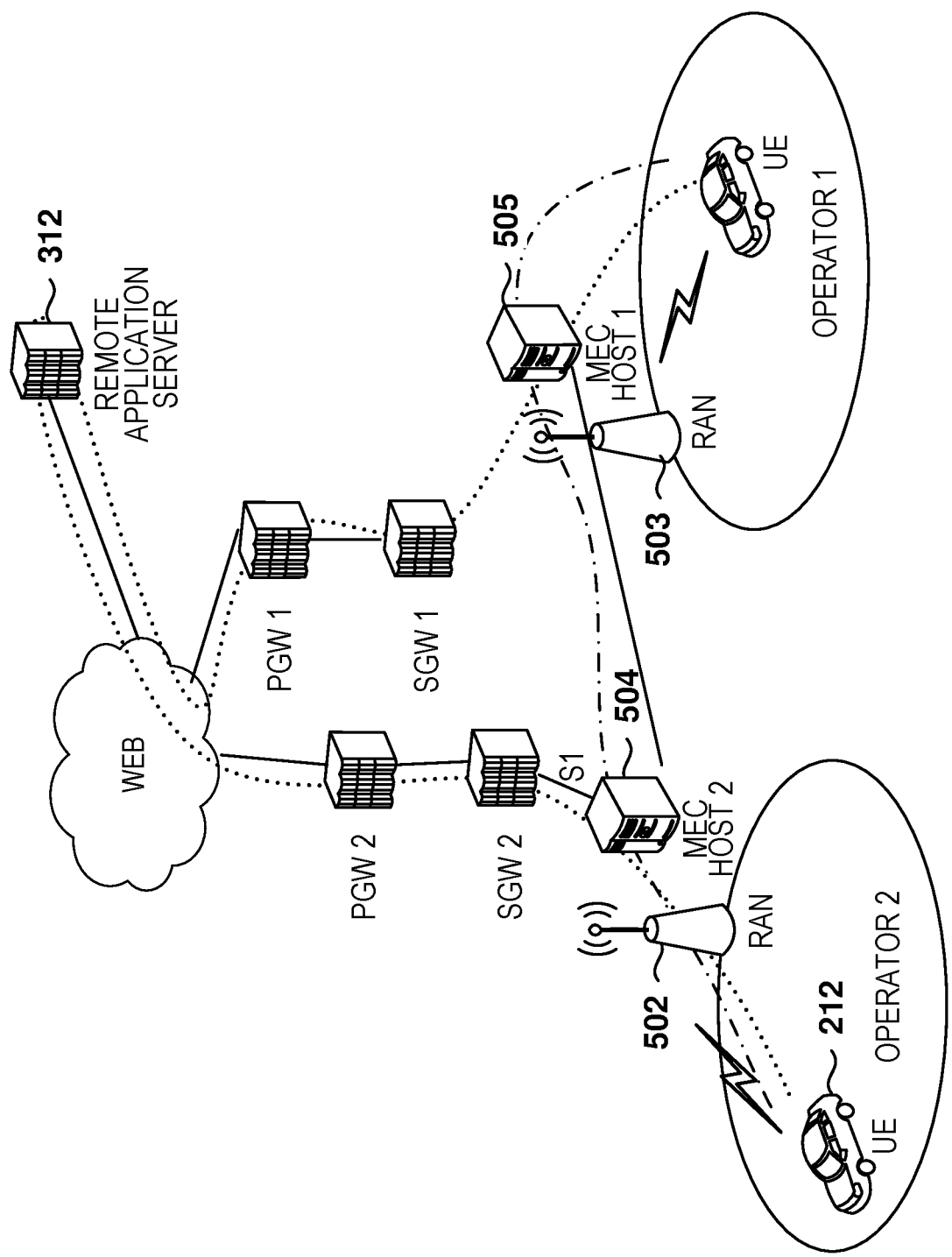
FIG. 5 illustrates an example V2X communication system utilizing MEC technology providing support for V2X applications, according to some example embodiments.

FIG. 5 depicts an example V2X communication system utilizing MEC technology providing support for V2X applications. A MEC system offers V2X services in a crosscountry, cross-operator, cross-vendor environment. The MEC system supports and/or provides various services to endpoint devices, each of which may have different requirements or constraints. For example, some services may have priority or Quality of Service (QoS) constraints (e.g., traffic data for autonomous V-ITS-Ss may have a higher priority than infotainment data), reliability and resiliency (e.g., traffic data may require mission-critical reliability, while infotainment data may be allowed some error variance), as well as power, cooling, and form-factor constraints. A variety of interfaces are used by a UE application (app) to request the MEC system to run an app (e.g., MEC app) in the MEC system, or to move an app in or out of the MEC system. Such interfaces include, for example, the Mp3 reference point used for internal MEC management, used for controlling communication between MEC platforms, and the Mx2 reference point used for external access.

In the typical multi-operator scenario, multiple operators 1 and 2 provide infrastructure to enable network connectivity for multiple UEs. An "operator" refers to an entity or organization that owns or controls infrastructure equipment (including radio infrastructure, core network and/or backhaul infrastructure, and the like) necessary to provide communications and/or network-related services. An operator provides technical capabilities to access a mobile network or wireless environment using an Over-the-Air (OTA) or wireless communication channel. The term "operator" as used herein may be considered synonymous to and/or referred to as a network operator, mobile network operator, cellular network operator, wireless service provider, wireless carrier, mobile network carrier, virtual MNO, and/or the like.

Furthermore, the RANs 502-503 may be macro cell base stations, small and/or micro cell base stations, access points, and/or other like network elements. The access points may be, for example, wireless routers, roadside ITS stations (R-ITS-Ss) or roadside units, gateway appliances, central hubs, and/or the like. The base stations may be, for example, 3GPP Long Term Evolution (LTE) evolved NodeBs (eNBs), 3GPP 5G/NR next generation eNBs (ng-eNBs) and/or next generation NodeBs (gNBs), and/or the like. A collection of RANs 502 may be referred to as an "access level edge network" or "access level edge."

In the example of FIG. 5, RAN 502 is co-located with an edge compute node 504 and RAN 503 is co-located with an edge compute node 505. In one example, the edge compute nodes 504-505 may be Multi-access Edge Computing (MEC) hosts or any other edge compute node, such as those discussed herein. The MEC hosts are entities that contain a MEC platform and a virtualization infrastructure to provide compute, storage and network resources to MEC apps. A EC platform is a collection of functionality (including hardware and software elements) that is required to run MEC apps on a specific MEC host's virtualization infrastructure and to enable them to provide and consume MEC services, and that can provide itself a number of MEC services. MEC apps are applications that can be instantiated on a EC host and can provide or consume MEC services, and MEC services are services provided via a EC platform either by the MEC platform itself or by a EC app.

In some example embodiments, the RANs 502-503 are RSUs, R-ITS-Ss, base stations, or RAN nodes (e.g., eNB, ng-eNB, gNB, or the like). In some example embodiments, the management services are virtualized entities provided by a cloud computing service and/or one or more cloud compute nodes (collectively referred to as a "cloud" or the like). In one example, the CUs may run within virtual machine(s) (VMs) and/or software container(s) that are provided by the cloud's virtualization infrastructure. In this implementation, the cloud may operate or include the aforementioned CU, or may provide management applications/services separate from the CU.

One challenging situation is when ITS operators attempt to provide the same or continuous V2X service to UEs connected to different RAN nodes, sometimes in temporary absence of radio coverage. This use case is also complicated by the presence of multiple MEC vendors, which leads to the need to enable communication between different MEC systems. This use case is further complicated when UE apps have relatively high QoS constraints. Furthermore, the allocation of sufficient radio resources within a cell coverage area of a RAN does not necessarily guarantee a particular QoS (or QoS performance) in V2X communications. Poor QoS performance is also linked to poor signal reception due to lack of coverage, signal interference, inefficient handover mechanisms, and inadequate transmission power management and handover mechanisms at the RANs.

V2X applications and services include, for example, safety apps/services, convenience apps/services, advanced driving assistance apps/services, and vulnerable road user (VRU) apps/services, among many others. Examples of the safety apps/services include Intersection Movement Assist (IMA) and Queue Warning (QW). IMA is designed to avoid intersection crossing crashes by warning drivers of vehicles approaching from a lateral direction at an intersection. Intersection crashes include intersection, intersection-related, driveway/alley, and driveway access related crashes. QW queue of vehicles on the road may pose a potential danger and cause delay of traffic (e.g., when a turning queue extends to other lanes). Using the V2X services, the queue information can be made available to other V-ITS-Ss 101 beforehand, which minimizes the likelihood of crashes and allows for mitigation actions.

Convenience apps/services include, for example, telematics, software updates, infotainment, and the like. Some of these apps/services can be implemented with existing access technology and are partly already supported by some car manufacturers.

Advanced driving assistance apps/services (also referred to as "advanced driver-assistance systems" or "ADAS") are electronic systems (comprising hardware and software elements) that help a vehicle driver while driving or parking a vehicle, and typically employ various microcontrollers, electronic control units (ECUs), sensors, and/or power semiconductor devices/systems (collectively referred to herein as "driving control units" or "DCUs") implemented in the vehicle. These apps/services are also applicable to autonomous driving apps/services The edge compute nodes 504-505 include the MEC V2X API, which is designed to facilitate V2X interoperability in multi-vendor, multi-network, and multi-access environments for automotive use cases.

Figure 6:
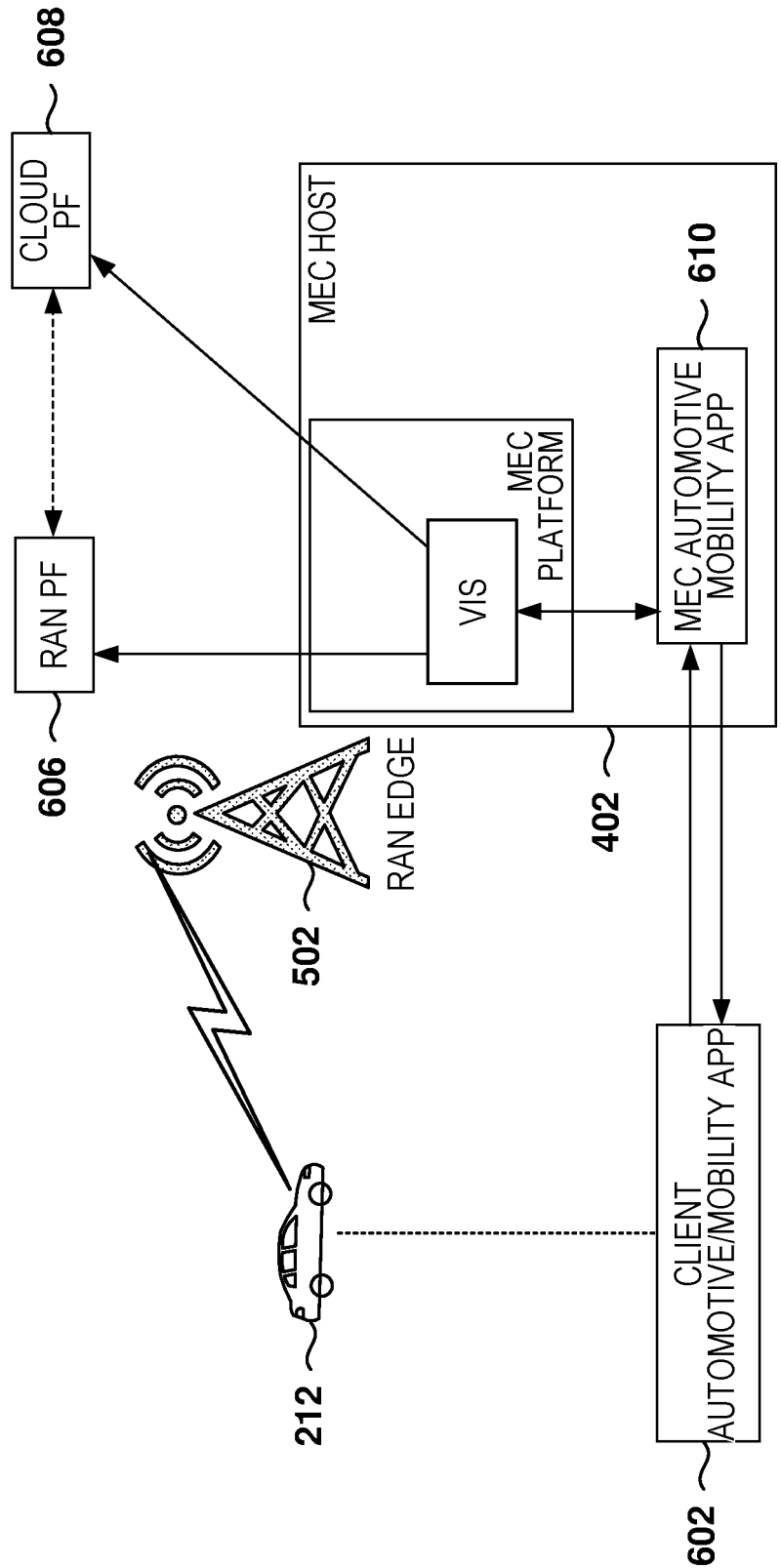
FIG. 6 depicts an exemplary scenario for practicing embodiments herein.

FIG. 6 depicts an exemplary scenario for practicing the embodiments herein. A client mobility app is executing at a UE 212, requesting QoS predictions, e.g., radio signal quality and edge host resource availability predictions.

Currently, IQNs are based on communications network information (e.g., RAN 502). In some example embodiments, IQNs are enhanced/extended to include information on edge compute node and/or edge cloud computational resource predictions. This set of information is referred to herein as enhanced In-advance QoS Notification.

Additionally, embodiments include a signaling framework to ensure that IQNs are accessible by edge computing providers (e.g., MEC host 402) in an interoperable manner. In these embodiments, the MEC V2X API may be exploited and/or enhanced.

A client app 602, instantiated at the computing unit in the UE, contains communications capabilities. In another embodiment, any road users, such as motorcycles or vulnerable road users such as cyclists, pedestrians, etc., are equipped with a corresponding embedded unit or handheld/wearable device hosting the client app 602. The client app 602 reports its planned journey information (e.g., map coordinates and/or route data) to the MEC host 402.

An MEC app 610 executes at the data network near a MEC platform (e.g., as part of the MEC host 402) and is collocated with respective RANs. In some example embodiments, the V2X App communicates the journey specifics to a respective MEC app 610 and, later on, provides this information as input to the RAN PF 606 and/or cloud PF 608.

A RAN PF 606, associated with RAN 502, is an application responsible for predicting radio signal quality at specific vehicular UE locations and times of interest. Further, a cloud PF 608 is an application that predicts edge resource availability at specific edge cloud deployment locations and times of interest. The cloud PF 608 is assumed reachable by multiple MEOs by a proper interface.

In previous solutions, it is assumed that "raw" data coming from various connected vehicles can be directly acquired and centrally processed at the network side for QoS inferencing (e.g., a centralized QoS prediction approach). However, the state-of-the-art centralized data fusion approach suffers from several drawbacks. First, low level of data privacy, as identity information of the data (measurement) contributing devices (vehicles) may be revealed to an adversary entity (e.g., a false base station/access point) either directly or via reverse engineering methods. Further, large datasets need to be transmitted via the UE C-V2X interface, thus limiting the communication efficiency of the protocol. This results in limited system scalability, i.e., a limited number of connected vehicles can share the available radio resources for data uploads.

Further, there is an absence of a user interface useful to visualize the predicted radio, edge cloud conditions at the chosen route, but also involving possible alternative routes that may be favorable depending on the requirements of the running client/in-vehicle application(s). Such a (graphical) user interface would facilitate route selection, e.g., among similar high-rated routes experienced by other vehicular users that used in-advance QoS predictions for route planning/application launch.

Further yet, in previous solutions, there is no exploitation of available sensory information (e.g., Radar, LiDAR, cameras) for the needs of in-advance radio QoS predictions.

Figure 7:
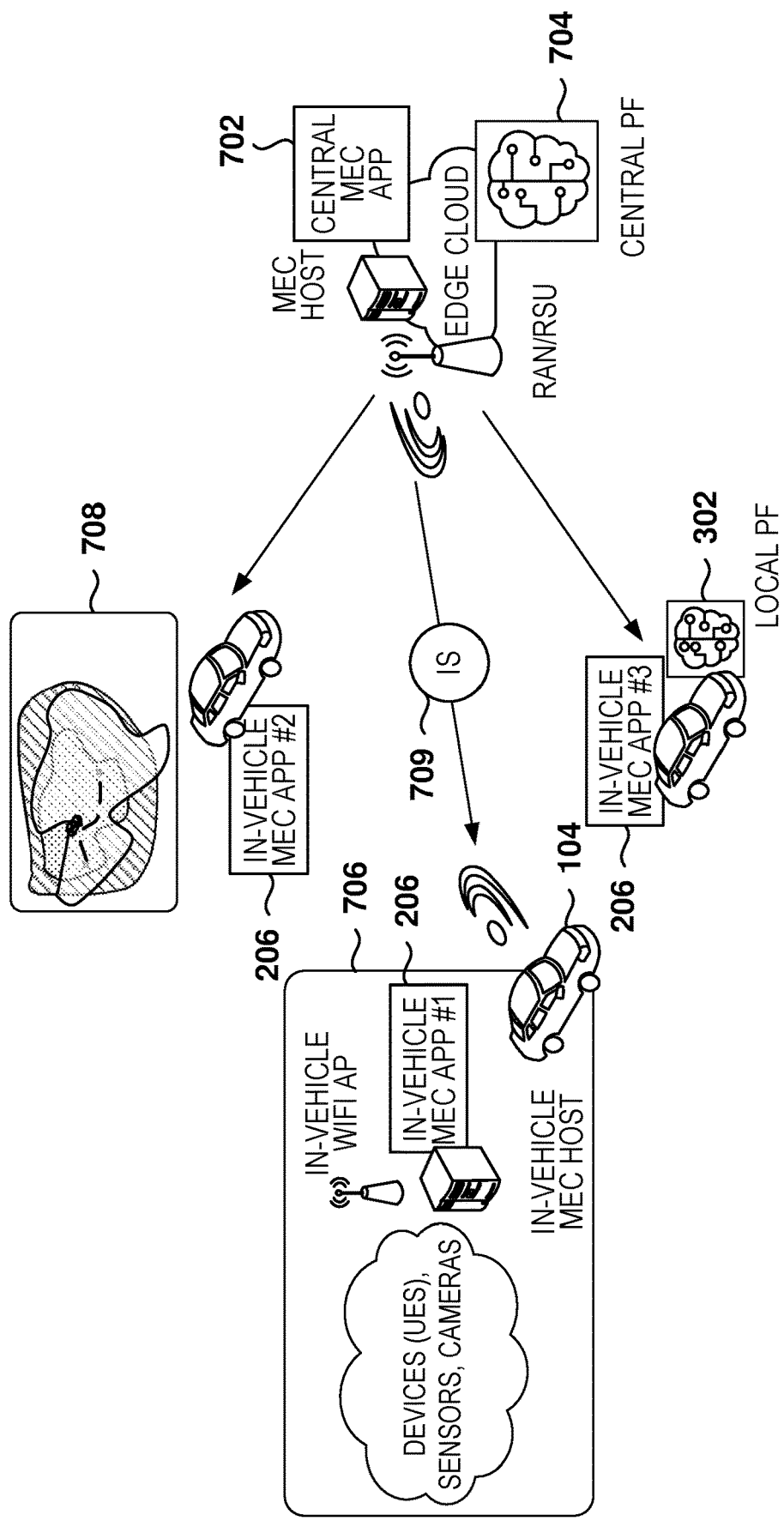
FIG. 7 illustrates a sample architecture for implementing QoS predictions, according to some example embodiments.

FIG. 7 illustrates a sample architecture for implementing QoS predictions, according to some example embodiments. Further, embodiments provide for the creation of a map, referred to herein as coverage map, for presenting in a graphical user interface (GUI) providing transportation service information, such as prediction on the QoS.

The coverage map is updated dynamically and collaboratively, based on the securely aggregated information from the talking elements of a federated learning system involving vehicles, pedestrians, RSUs, and edge cloud infrastructure. In this map, the availability of certain C-V2X features (in compliance with their required QoS and reliability) is tracked and projected over time and space, for decision making (e.g., on autonomous driving feature activation for the end-user) by the different users of the system.

The PQoS utilizes local sensory data coming from vehicles 104 and other traffic participants, e.g., pedestrians, cyclists. Moreover, the context includes nearby streets, roads, etc., as part of a city area served by a central MEC app 702.

The PQoS framework includes several components: an HMI 708, in-vehicle MEC host 706, the local PF 302, information signaling frameworks 709, a central MEC app 702, and a central PF 704.

During training of the federated PQoS learning model, the central MEC app 702 obtains local QoS prediction model parameters from multiple distributed in-vehicle MEC apps and then provides an update of the overall area's QoS prediction model (needed to locally produce the area's prediction digital twin) to MEC-enabled vehicles, even those vehicles that did not contribute their local PQoS models.

During the inferencing stage, the central MEC app 702 forwards QoS predictions performed by the central PF 704, including the expected level of support for various end-user services, to VIS service consumers (e.g., V2X client apps) at the vehicle's side. In cases where the vehicle 104 does not include a MEC host, the inferencing for vehicles equipped with MEC infrastructure is performed locally at the vehicle after the download of the global prediction model.

The coverage map is used not only for travel planning, but also for trajectory and route sharing ratings to optimize the overall (both communication and vehicular) traffic efficiency and road safety.

In some example embodiments, the PQoS system is supported by two communications protocols: i) a sensor data-based local perception communication protocol among vehicles or between a vehicle and other traffic participants, and ii) an application-level communication protocol between in-vehicle MEC apps 206 and the central MEC app 702. This enables the in-vehicle construction of the city's predicted digital twin based on the communicated parameters of the global PQoS prediction model.

In some example embodiments, to improve data privacy, system scalability and communication efficiency, instead of transmitting raw data (e.g., radio signal quality measurements, MEC resource use telemetry measurements), the global system digital twin updates are based on the obtainment and aggregation of micro-system digital twins (micro-HD maps) contributed by in-vehicle MEC apps 206.

The proposed PQoS solution introduces interoperable elements to enable interoperability for applications and advanced services, especially in heterogeneous C-V2X scenarios, e.g., multi-MNO, multi-vendor, multi-OEM environments. This need of interoperability is highly requested by the automotive industry and solutions to address these requirements are not yet available.

Some vehicles are equipped with a Human Machine Interface (HMI) 708 (e.g., display, buttons, touchscreen) to provide input on the trip origin's location, time, and end location of journey. The display of the HMI 708 is configured for showing a map with the geographical support of various services (e.g., autonomous driving, infotainment, content delivery).

Further, the in-vehicle MEC apps 206 collect data and measurements from V2X, sensors, cameras, etc., as well as from local network of user devices within short range, and share the collected data with other MEC apps.

Further, a local PF 302, executing at each in-vehicle MEC host, obtains local contextual information and shared route preferences as input, and issues joint radio and edge cloud QoS predictions for all involved locations and times as output, based on a local update of the previously downloaded region-wide QoS prediction model.

The central MEC app 702 builds a global regional PQoS prediction model by aggregating local prediction model updates tailored to a set of mobility services.

Regarding the HMI 708, modern vehicles are equipped with a number of technologies for HMI, and a common device is a display controlled either via touchscreen, knobs, or buttons. Another possibility is the use of voice recognition, where the driver or passenger provides voice commands and the machine acknowledges and confirms via voice synthesis. Additionally, gestures can be used to provide the inputs, and the driver or the passenger can enter data and parameters with the gestures that are detected by cameras or millimeter wave radars.

For example, the HMI 708 may be used to enter the destination for the current trip and stopovers or waypoints, if any. Further, for a future trip, the starting location could be additionally entered via the HMI 708.

In addition to the in-vehicle HMI, the user should also be able to provide the route information via apps in the smartphone, tablet, PC, or other mobile devices in the car, but not necessarily directly connected to the in-vehicle network (or alternatively, even devices outside the car may need to use the same prediction system, for an offline planning of the trip, before entering the car). The route information entered via such external devices should be automatically available to the in-vehicle journey management system. A backend or edge cloud application, accessible by the vehicle app and by the other mobile devices, is used to gather the information.

For example, a client app running on the car cockpit can be connected with the above described HMI, as well as other client app instances, running on smartphones, tablets, PCs, or other devices (inside or outside the car), synchronized with the client app in the cockpit. Also, the MEC app 206 running on the in-vehicle MEC host 706 can be connected to the local in-vehicle WiFi access point.

A modern vehicle is equipped with several computing units and sensors (cameras, radar, LIDAR, microphones, ultra-sound, etc.), and soon, vehicles will also be equipped with V2X functionalities, which enable data exchange between vehicles, vehicles and road infrastructure, and vehicles and other traffic participants.

The computing units are referred to as electronic control units (ECU), which are embedded systems that control one or more of the electrical or, including mechanical, subsystems in the vehicle 104. Some examples include the door control unit, engine control unit, HMI, powertrain control module, battery management system, anti-lock braking system, telematics control unit (TCU), etc. Some of the control units are connected to sensors and to actuators to perform driving or driving assistance functions.

The number of ECUs, however, has been increasing so dramatically, that it is not only hard to pack them inside the car, but also to network or cable them. There is a tendency that the functions of many or most of those controllers be consolidated into a centralized, more powerful computing unit, the so-called ECU consolidation. The different control functions are then virtualized in that central unit. It is expected that the future vehicle will contain a small number of central computing units that will run virtualized instances of multiple functionalities related not only to the vehicle control itself but to the overall mobility service as well as in-vehicle entertainment, aka infotainment. Those centralized computing units will play the same role as MEC hosts, which we call here in-vehicle MEC infrastructure. Since it is necessary that the data from the different sensors and from V2X are processed at the computing units for the driving functions, this same data can be consumed by applications running in the MEC hosts to support the mobility services.

The in-vehicle MEC host 706 contains a MEC platform, referred to herein as in-vehicle MEC app 206, capable of communicating with other MEC hosts, e.g., via an in-vehicle WiFi access point, or via cellular network connectivity.

The in-vehicle MEC host 706 includes several hardware and software components. From a hardware level, redundant computing units are necessary for the safety relevant subsystems, which include watchdog functionalities to meet functional safety requirements. On the software level, there are multiple layers of orchestration of the different virtualized functionalities with a clear separation between safety and critical functionalities, and those related to infotainment and mobility services.

The local PF 302 performs PQoS predictions based on journey-specific input and may be implemented via a machine-learning model, e.g., neural network, or a logistic regression model. To train the PQoS prediction model, the in-vehicle MEC app 206 may obtain, for training purposes, several kinds of information from different sources, such as radio measurements collected by the car, outputs from sensors, information from user devices in the car, and information from nearby vehicles and devices.

In some example embodiments, the format for sharing predictions produced by the local PF, using IQN, is shown in Table 1:

TABLE 1

| IQN type | IQN sub-type | ID | Predicted KPI | Time values |
| --- | --- | --- | --- | --- |

The predicted Key Performance Indicator (KPI) attribute of the message structure includes a KPI, which can be the latency, reliability, packet delivery ratio, throughput, User Plane (UP) connection, network utilization, delay variation (jitter), availability (of the communication service), accuracy, etc.

In addition, similar to the 5GAA references mentioned above, has specified a resource data type called PredictedQos. This data structure, reproduced in Table 2, is sent to the VIS service consumer following its request on journey-specific QoS predictions.

TABLE 2

| Name | Data type | Cardinality | Remarks |
| --- | --- | --- | --- |
| timeGranularity | TimeStamp | 0 . . . 1 | Time granularity of visiting a location. |
| locationGranularity | String | 1 | Granularity of visited location. Measured in meters. |
| routes | Structure (inlined) | 1 . . . N | Information relating to the potential routes of a vehicular UE. |
| >routeInfo | Structure (inlined) | 2 . . . N | Information relating to a specific route. The first structure shall relate to the route origin and the last to the route destination. Intermediate waypoint locations may also be provided. |

TABLE 2-continued

| Name | Data type | Cardinality | Remarks |
|---|---|---|---|
| >>location | LocationInfo | 1 | Vehicular UE location. |
| >>time | TimeStamp | 0 . . . 1 | Estimated time at the location. |
| >>rsrp | Uint8 | 0 . . . 1 | RSRP as defined in [R14], [R15]; only included in the response. |
| >>rsrq | Uint8 | 0 . . . 1 | RSRQ as defined in [R14], [R15]; only included in the response. |

NOTE:
The data type of locationGranularity is a string which indicates the granularity of a visited location by means of latitudinal and longitudinal margins.

In the current solutions, only V2X applications (e.g., MEC apps and client apps) receive such notifications with the aim to take proper actions prior to signal quality degradation. The PQoS information is not accessed by MEC service providers, and therefore, it cannot be used for MEC PoP optimization per a performance criterion. Also, the payload message of IQNs only includes attributes related to performance metrics tightly related to radio signal quality, thus, only reflecting the RAN and CN parts of a radio access system. Predictions of the expected availability of MEC processing, storage and memory resources are neither performed nor included in the state-of-the-art IQN message.

In some example embodiments, the local PF 302 and the central PF 704 may be either responsible for all tasks including training data collection, model training and inferencing, or a different entity (e.g., an "AI function") may be responsible for data collection and model training, leaving to the PFs the process of inferencing to generate predictions.

It is noted that the user, via the HMI 708, may exploit the federated PQoS prediction model directly as the model parameters stored in the local PF 302 facilitate the creation of the system's digital twin, given a map with locations and times of interest, together with preferred services that may need to be launched on the road.

In some example embodiments, two information signaling frameworks 709 are provided: a signaling framework to collaboratively train an automotive federated learning model, and another federated learning model for edge cloud PQoS inferencing. Both signaling frameworks utilize standardized MEC interfaces and a proposed extension of the standardized MEC V2X API.

The central PF 704 aggregates the received local model updates and produces an update of the global prediction model (e.g., by averaging the parameters of the updated local prediction models). Further, the central PF 704 performs PQoS predictions tailored to client applications instantiated at vehicular UEs not having a MEC host installed onboard.

The central MEC app 702 obtains local PQoS prediction model parameters from multiple distributed in-vehicle MEC apps for training of the federated PQoS learning model. The central MEC app 702 then provides an update of the overall area's PQoS prediction model (needed to locally produce the area's prediction digital twin) to MEC-enabled vehicles, even different from the ones contributing the local areas' QoS prediction models.

During inferencing, the central MEC app 702 forwards PQoS predictions performed by the central PF 704, including the expected level of support for various end-user services, to VIS service consumers (e.g., V2X client apps) at the vehicle's side. Further, centralized inferencing is performed to provide QoS predictions to V2X Apps instantiated at vehicles which lack of an in-vehicle MEC host.

Figure 8A:
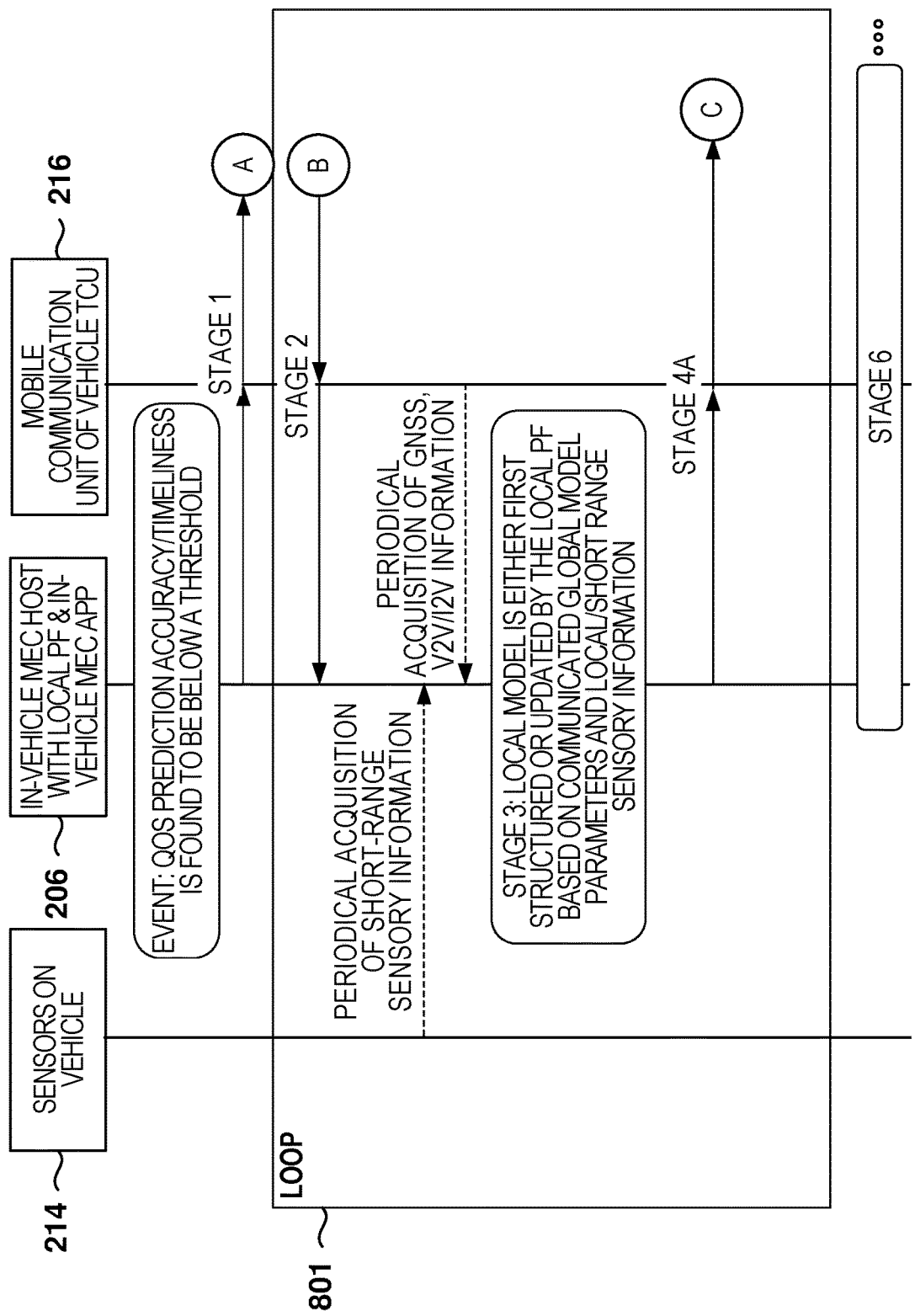
FIGS. 8A-8B illustrate a signaling framework to collaboratively train an automotive federated learning model for QoS predictions.
Figure 8B:
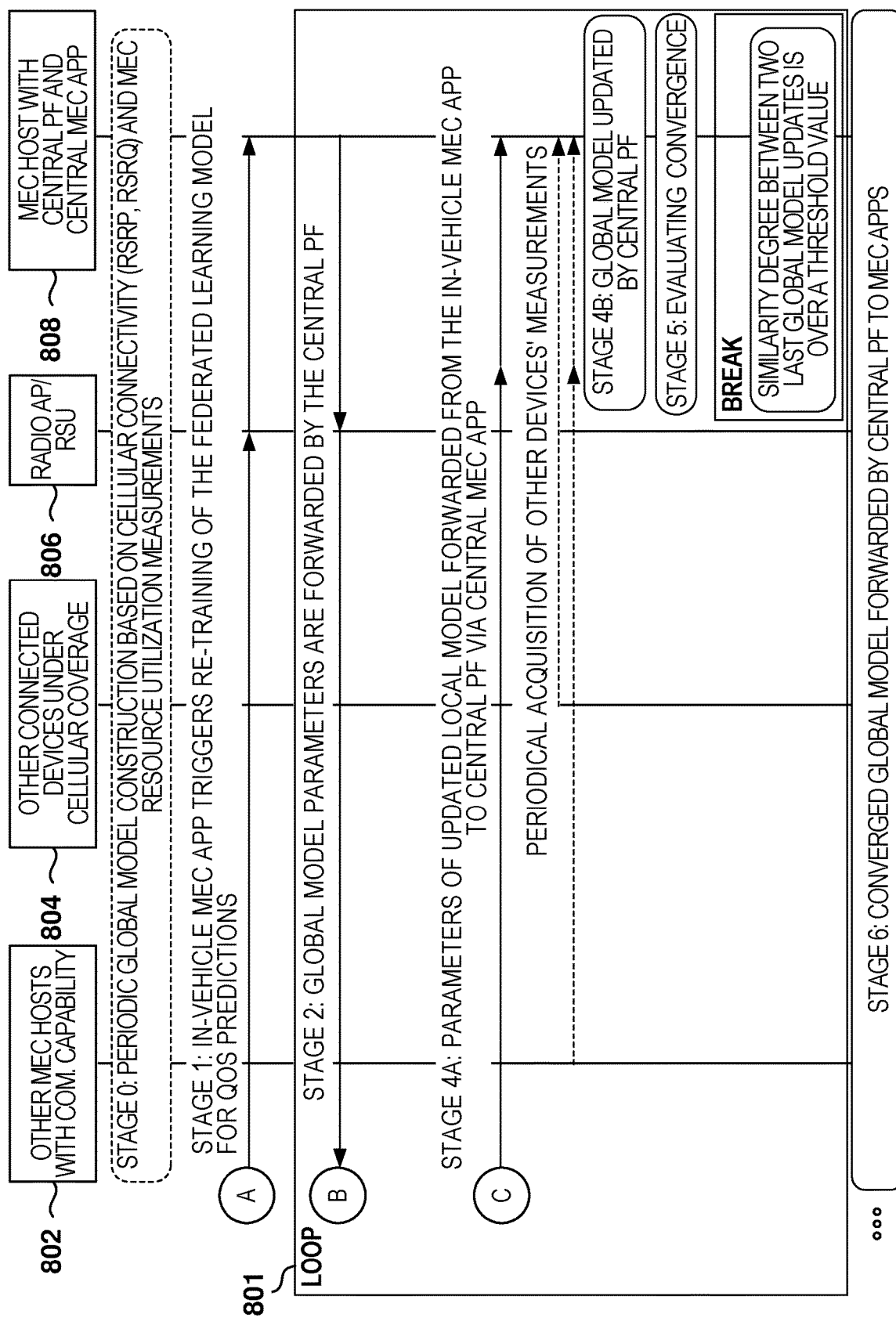

FIGS. 8A-8B illustrate a signaling framework to collaboratively train an automotive federated learning model for QoS predictions. To collaboratively train the PQoS federated learning model, an iterative process is utilized until the model converges to a predetermined level of accuracy. The federated PQoS learning model is called "holistic" because it includes both radio signal and edge cloud resource availability information.

As shown in FIG. 8B, at stage 0, the PQoS learning model, for issuing joint radio and edge cloud PQoS predictions, is built by training an ML program based on cellular connectivity measurement data, such as RSRP/RSRQ measurements coming from all UEs connected to the cellular network (e.g., vehicles and other devices) and MEC resource utilization measurements from nearby MEC hosts (moving and static ones).

In some example embodiments, the PQoS learning model is generated in the central PF instantiated within the MEC host 808. Examples of model parameters, also referred to herein as features, include weights, biases, and gradient values of a neural network, or coefficients of a logistic regression model.

Stage 0 may be repeated periodically (e.g., daily, outside rush hours) once a sufficient number of time-stamped measurements is collected by the RAN and the MEC host.

The accuracy of the PQoS model is monitored over time by analyzing quality metrics of results, such as user ratings of different routes contributed by various connected vehicles. When the quality metrics fall below a predetermined threshold, stage 1 (see FIGS. 8A and 8B) is performed to re-train the PQoS model by the central PF.

A loop 801 includes operations for continuous improvement of the PQoS model, which includes releasing the PQoS model to multiple entities, utilizing the PQoS model to gather additional data, and improving the model with the additional collected data.

At stage 2 within the loop 801, the parameters of the global PQoS model are forwarded by the central PF of the MEC host 808 (utilizing VIS, the central MEC app, the in-vehicle MEC app and the in-vehicle VIS) to local PFs at in-vehicle MEC app 206 that are currently under coverage. This set of vehicles may include vehicles previously contributing to the global model, as well as new vehicles with such capability entering the coverage area of the radio AP/RSU.

The loop 801 further includes periodical acquisition of short-range sensor information that is sent from the sensors 214 on the vehicle to the local PF via the in-vehicle MEC app 206, and periodical acquisition of GNSS and V2V/I2V information sent from the mobile communication unit of the vehicle TCU 26 to the local PF via the in-vehicle MEC app 206.

Further within loop 801, at stage 3, the local models stored in the in-vehicle MEC hosts are updated by each vehicle's local PF based on the downloaded parameters of the global model and the local sensory data coming from RADAR, LiDAR, cameras, and other sensors installed both in the same vehicle (including passenger devices such as smartphones) and in nearby vehicles and VRU devices within short range (V2V, I2V signals).

Further, at stage 4A within the loop 801, the parameters of the updated local models for joint radio/edge cloud QoS predictions are forwarded (utilizing in-vehicle VIS, VIS, and via the in-vehicle and central MEC apps) from the local PF inside the in-vehicle MEC app 206 to the central PF in the MEC host 808 hosting the global model.

Additionally, within loop 801, the central PF of the MEC host 808 receives periodic updates of devices' measurements from other MEC hosts 802 and other connected devices 804.

At stage 4B, inside loop 801, the global PQoS model is updated by the central PF in MEC host 808, based on the uploaded cross-vehicle local model parameters and any measurement data collected in the meantime by other devices not carrying a MEC host.

At stage 5, the convergence of the updated PQoS global model is evaluated, by comparing the new recalculated PQoS model to the PQoS model in the previous iteration. If a degree of similarity between the two last global PQoS model updates is over a predefined "model similarity threshold" (for example, when the norm of the difference of the two last obtained model parameter vectors is sufficiently small), the iterative training procedure of loop 801 stops, and the method follows to stage 6.

If a degree of similarity between the last two global PQoS model updates is not over a predefined "model similarity threshold," then the loop 801 repeats starting with stage 2.

At stage 6 (outside the loop 801) the PQoS global model is forwarded by the central PF (utilizing VIS, in-vehicle VIS and the central and in-vehicle MEC Apps) to the local PFs together with a notification informing of training completion. The recipients of the converged global model parameters may be model contributors or entirely new devices with processing capabilities which are under coverage.

Figure 9:
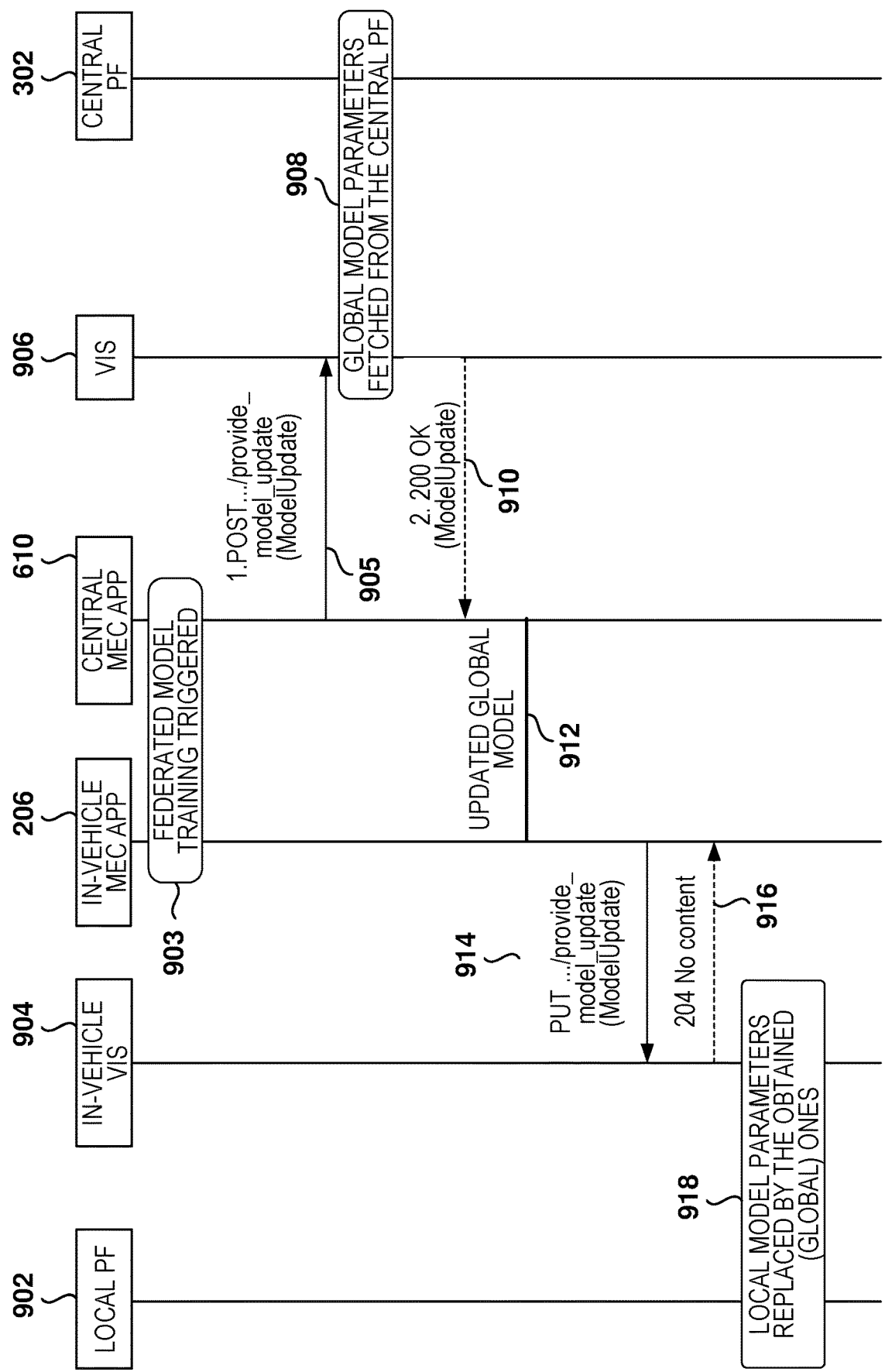
FIG. 9 illustrates details of stage 2 of the federated PQoS model training procedure, according to some example embodiments.

FIG. 9 illustrates details of stage 2 of the federated PQoS model training procedure, according to some example embodiments. At operation 903, the training of the federated PQoS model is triggered. At operation 905, a request is sent to the VIS 906 via a POST request (e.g., POST . . . /provide_model_update (ModelUpdate)).

At operation 908, the global model parameters are fetched from the central PF 302. A response to the POST request is sent, in operation 905, to the central MEC app 610 (e.g., including the ModelUpdate data type in the response message).

The PQoS model is updated at operation 912, and in operation 914, the in-vehicle MEC app 206 sends a PUT request to the in-vehicle VIS 904 (e.g., PUT . . . /provide_model_update (ModelUpdate). At operation 916, the in-vehicle VIS 904 replies the PUT request (e.g., 204 no content).

At operation 918, the local model parameters, at the local PF 902, are replaced by the new received global parameters for the PQoS model.

Figure 10:
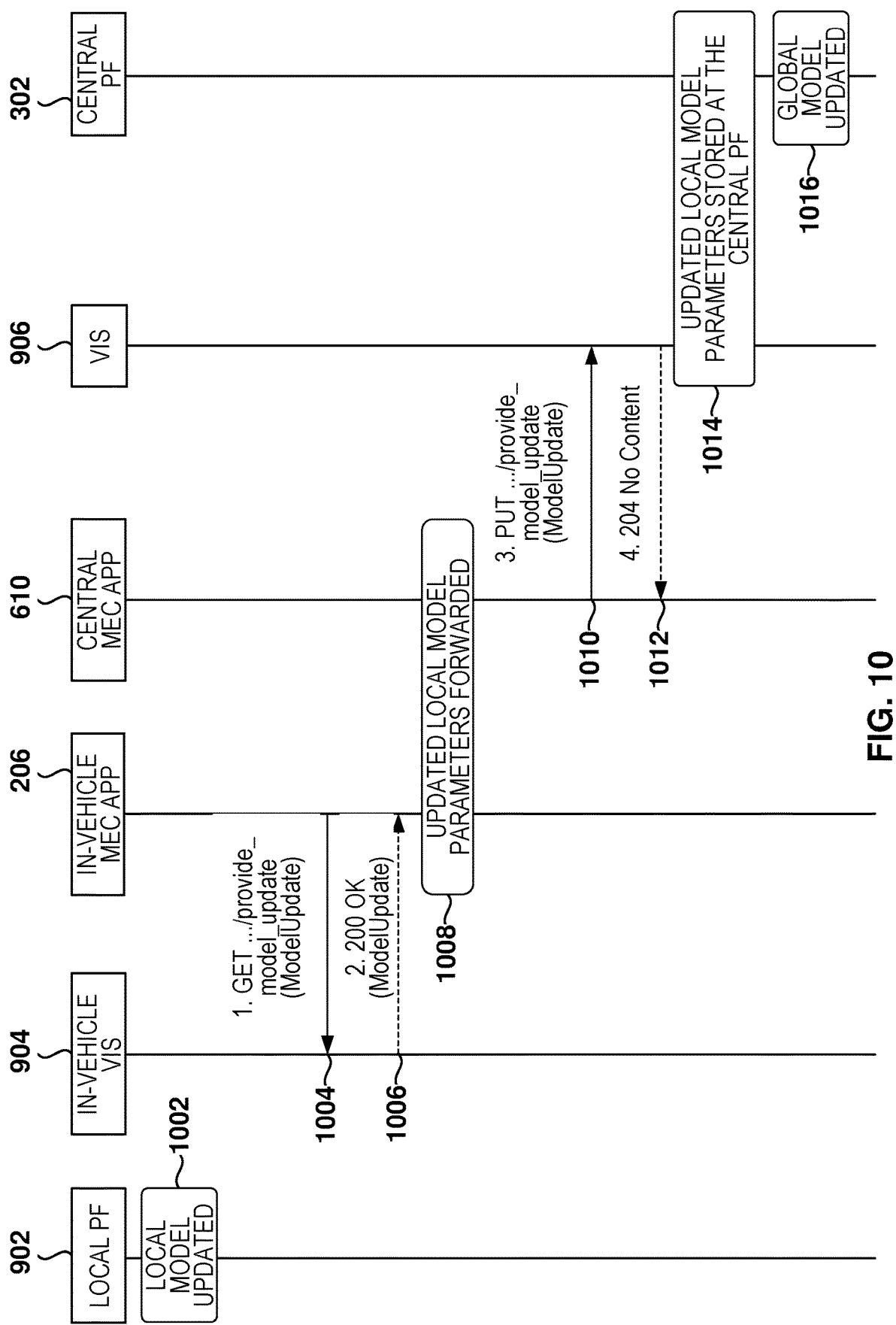
FIG. 10 shows the detailed signaling of stage 4 of the federated PQoS model training procedure, according to some example embodiments.

FIG. 10 shows the detailed signaling of stage 4 of the federated PQoS model training procedure, according to some example embodiments. At operation 1002, the local PF 902 updates the local PQoS model.

Further, at operation 1004 the in-vehicle MEC app 206 sends a request to the in-vehicle VIS 904 for an update on the model (e.g., GET . . . /provide_model_update (ModelUpdate)). The in-vehicle VIS 904 replies 1006 with the updated PQoS model.

At operation 1008, the updated local model parameters are forwarded to the central MEC app 610. Further, at operation 1010, the central MEC app 610 sends a PUT request to the VIS 906 (e.g., PUT . . . /provide_model_update (ModelUpdate). The VIS 906 replies 1012 with an acknowledgment (e.g., 204 no content).

At operation 1014, the central PF 302 updates the local PQoS model parameters stored at the central PF 302. Further, at operation 1016, the central PF 302 updates the global PQoS model.

Figure 11:
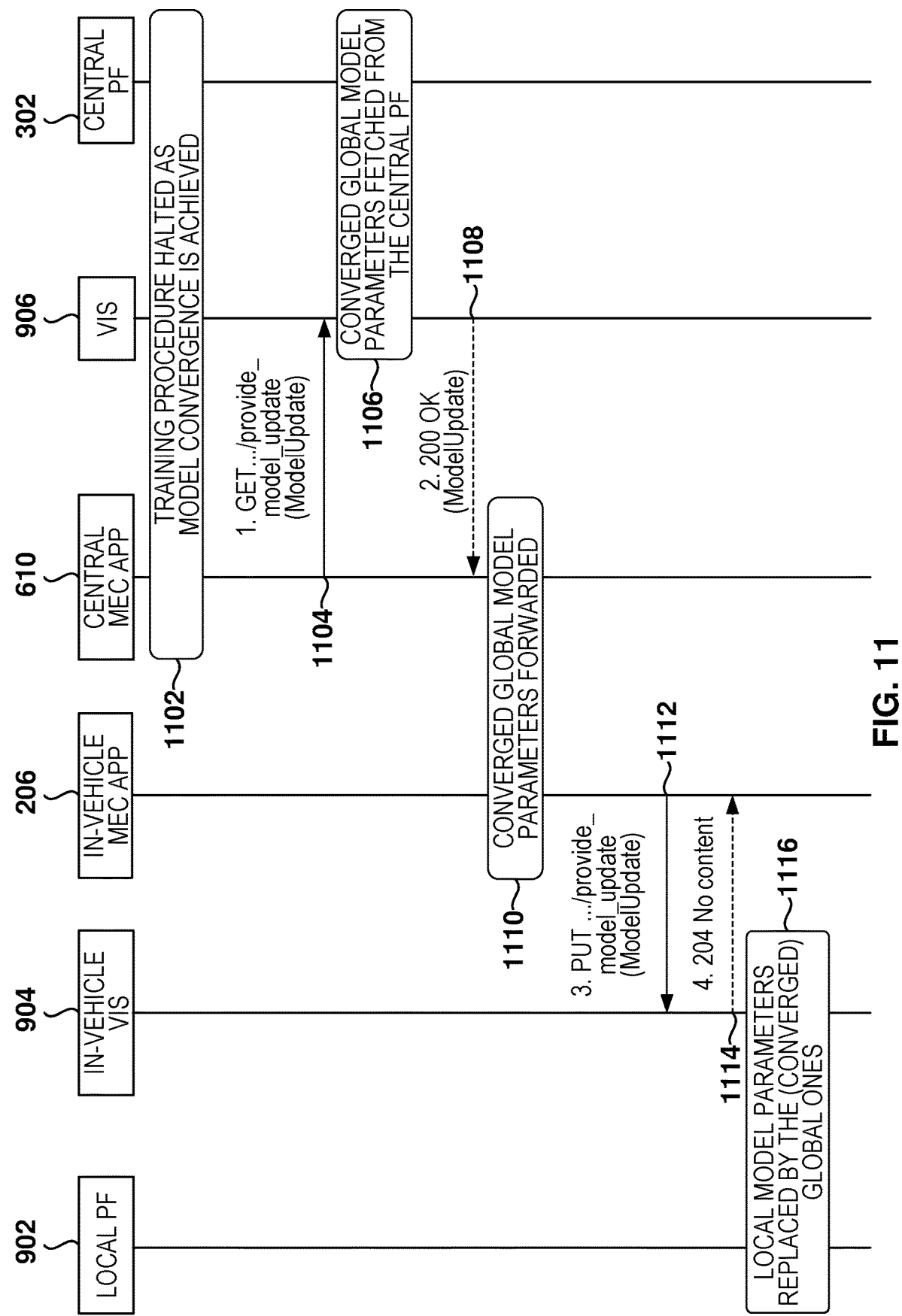
FIG. 11 shows the detailed signaling of stage 6 of the federated PQoS model training procedure, according to some example embodiments.

FIG. 11 shows the detailed signaling of stage 6 of the federated PQoS model training procedure, according to some example embodiments. At operation 1102, the training procedure is halted as the model convergence is achieved, as illustrated in the loop 801 of FIGS. 8A-8B.

At operation 1104, the central MEC app 610 requests an update of the model from the VIS 906 (e.g., GET . . . /provide_model_update (ModelUpdate)).

At operation 1106, the VIS 906 fetches the converged global PQoS model parameters from the central PF 302, and sends a response 1108 to the central MEC app 610 (e.g., 200 OK ModelUpdate).

At operation 1110, the central MEC app 610 forwards the new PQoS model parameters to the in-vehicle MEC app 206, which then sends an update (operation 1112) to the in-vehicle VIS 904 (e.g., PUT . . . /provide_model_update (ModelUpdate)). The in-vehicle VIS 904 responds (operation 1114) with an acknowledgment (e.g., 204 no content).

At operation 1116, the local PQoS model parameters are replaced with the new updated PQoS model parameters.

In some example embodiments, the ModelUpdate data type represents the model based on which QoS predictions are performed by either the local PF 902 or the central PF 302. The attributes of the ModelUpdate data type are described below with reference to Table 3.

TABLE 3

| Name | Data type | Cardinality | Remarks |
|---|---|---|---|
| modelId | String | 1 | ID of the QoS prediction model |
| modelVersionNumber | Integer | 1 | Version number of the model |
| modelAccuracy | Uint8 | 1 | Achieved accuracy of model after testing |
| lossFunction | Enum (inlined) | 1 | Objective/loss function with the following permitted values: MEAN_SQUARED_ERROR MEAN_ABSOLUTE_ERROR MEAN_BIAS_ERROR |
| modelParameters | Structure (inlined) | 1 | Set of model parameters |
| >parameter | Uint8 | 2 . . . N | Model parameter (e.g., neural network weights, biases, gradients, linear model coefficients etc.). |

Figure 12:
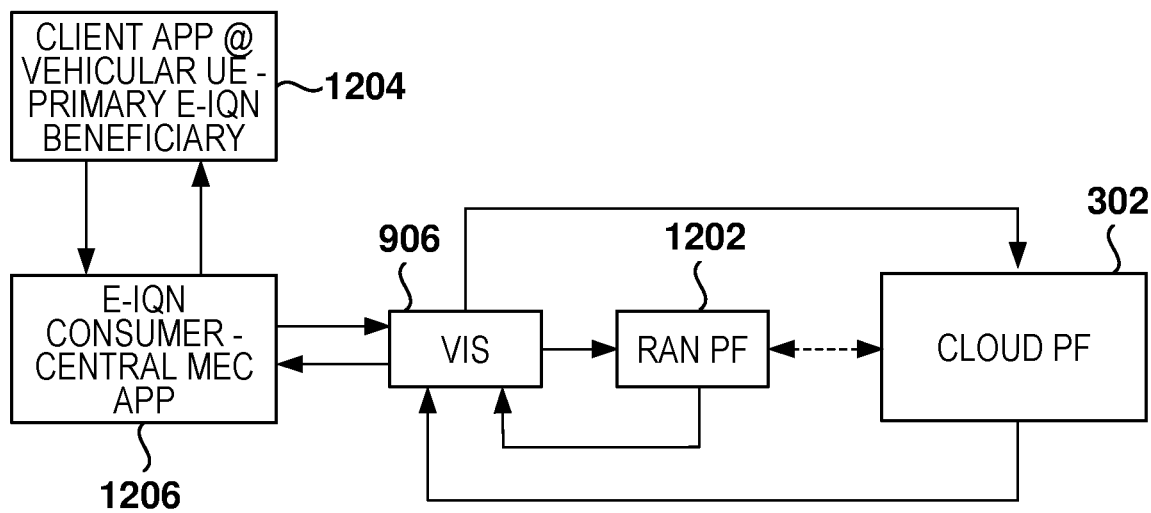
FIG. 12 shows logical interactions among the various entities discussed herein allowing In-advance QoS Notification (IQN) communications between different IQN consumers and IQN producers, according to some example embodiments.

FIG. 12 shows logical interactions among the various entities discussed herein allowing IQN communications between different IQN consumers (e.g., a MEC app corresponding to a V2X application instantiated at a vUE) and IQN producers (e.g., MEC app owned/managed by a car OEM/service provider). This signaling framework refers to the case where there is no MEC host installed at the vehicle side.

In this example, a first IQN consumer is a client app 1204 executing at a UE, which can be the primary beneficiary of IQN information, and a second IQN consumer, which is a central MEC app 1206 managed by a service provider (e.g., vehicle OEM or a fleet manager).

An IQN request is generated by either the client app 1204 or the central MEC app 1206 and transmitted to the VIS 906, e.g., through the MEC V2X API. The VIS 906 interacts with the RAN PF 1202 and the central PF 302 to obtain radio and edge cloud-related IQN attributes, respectively.

After predictions are created by the RAN PF 1202 and the cloud PF 302, they will provide the corresponding attributes of the IQN message via the V2X API to the IQN consumer, e.g., the RAN PF 1202 will provide the IQN attributes on radio signal and network quality along the vehicle's route (focusing, for example, on the request of client app 1204—MEC app corresponding to a V2X app executed at a vehicular UE), whereas the cloud PF 302 will provide the IQN attributes on available edge computing resources (i) along the designated vehicle's route, as a response to a request of client app 1204, or, (ii) over a service deployment area, as a response to a request of the central MEC app 1206.

Once both domains' IQN prediction attributes are collected by the VIS, the latter will concatenate them to form a single compound IQN response message to be sent to the requesting app via the V2X API. The two phases of the communication (e.g., the retrieval of predictions from the two PFs and the concatenation of IQN) can be asynchronous and done in separated moments in time. In some example embodiments, a buffering of these two phases might be needed (e.g., because the predictions are generated with different periodicities and different phase offsets). Thus, the messages in FIG. 12 should not necessarily be seen as strictly consequential.

Figure 13:
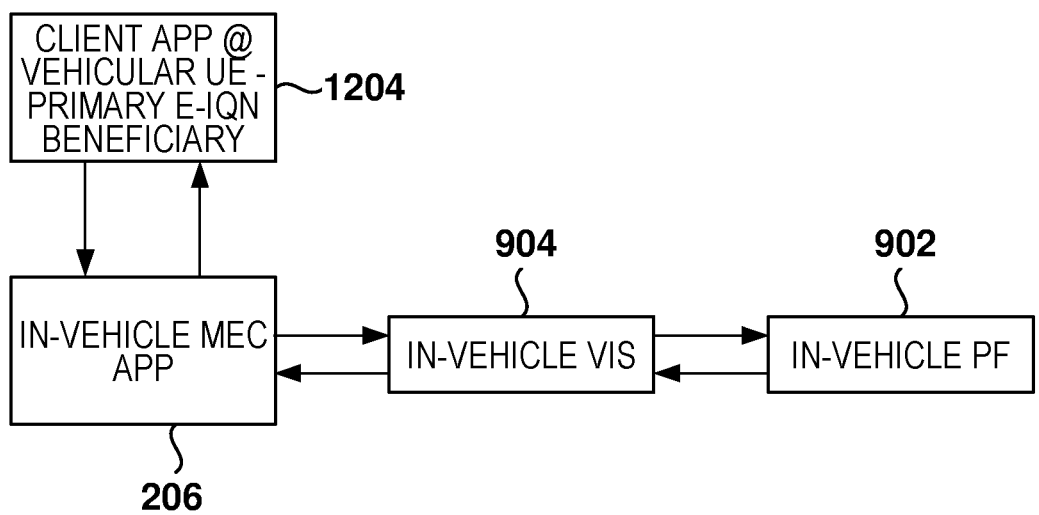
FIG. 13 is a signaling framework for journey-specific QoS inferencing in the existence of a EC host installed at the requestor vehicle side, according to some example embodiments.

FIG. 13 is a signaling framework for journey-specific QoS inferencing in the existence of a EC host installed at the requestor vehicle side, according to some example embodiments. In this case, the client app 1204 and the in-vehicle MEC app 206 interface with the in-vehicle VIS 904, which in turn interacts with the in-vehicle PF 902.

In this case, assuming that the converged global PQoS model has been downloaded by this vehicle, and the local PF 902 has been updated accordingly, the PQoS predictions can be performed locally within the in-vehicle MEC host itself, without the need to communicate the QoS prediction request to the central PF, which results in less communication overhead.

Figure 14:
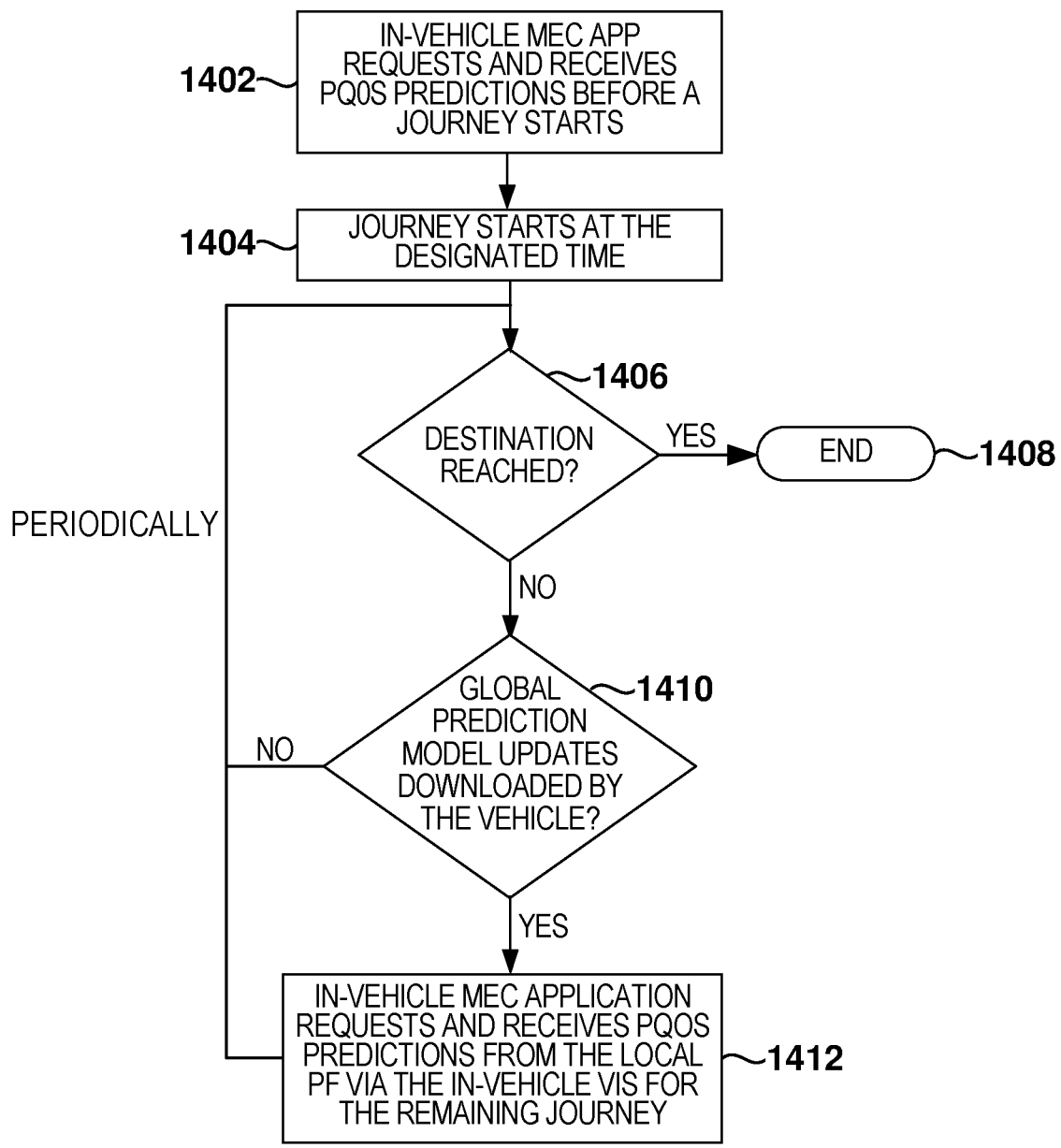
FIG. 14 is a flowchart of a method for obtaining journey-specific QoS predictions, according to some example embodiments.

FIG. 14 is a flowchart of a method for obtaining journey-specific QoS predictions, according to some example embodiments. Since the global prediction model may be updated multiple times during a planned journey, instead of the QoS prediction client issuing a single request before the start of the journey, QoS inferencing (predictions) may be performed on a regular, automated basis.

Still using the request/response method, a new request for the remaining waypoints of the planned journey is issued as soon as an update of the global prediction model is downloaded by the vehicle and stored at the in-vehicle MEC host (e.g., at the local PF). This is applicable to QoS prediction requests coming from vehicles equipped with an in-vehicle MEC host.

Applying the publish/subscribe method, the in-vehicle MEC application subscribes to the in-vehicle VIS service, which issues notifications when the predicted QoS in the remaining journey is found to be below a threshold indicated by the service consumer upon subscription. In order to not receive notifications for the predicted QoS at already visited locations (e.g., when the vehicle moves at a higher speed than originally expected), the subscription is renewed with the remaining journey locations and expected arrival times each time one of the intermediate waypoints is visited. This method is applicable to both types of vehicular UEs, e.g., the ones with and without an in-vehicle MEC host installed on board the vehicle.

It is noted that QoS predictions are performed by the local PF on a regular basis along the journey, even in the absence of global model updates, and the local prediction model may be updated based on local information (e.g., sensors, cameras, V2X signals).

At operation 1402, the in-vehicle MEC app requests and receives PQoS predictions before a journey starts. From operation 1402, the method flows to operation 1404, where the journey starts at the designated time.

Periodically, a check is performed at operation 1406 to determine if the destination has been reached. If the destination has been reached, the journey ends (operation 1408), and if the destination has not been reached, the method flows to operation 1410, where a check is made to determine if there are global prediction PQoS model updates downloaded by the vehicle. If PQoS model updates have been downloaded, the method flows to operation 1412; otherwise, the method flows back to operation 1406.

At operation 1412, the in-vehicle MEC app requests and receives PQoS predictions from the local PF via the in-vehicle VIS for the remainder of the journey. From operation 1412, the method loops back to operation 1406.

Figure 15:
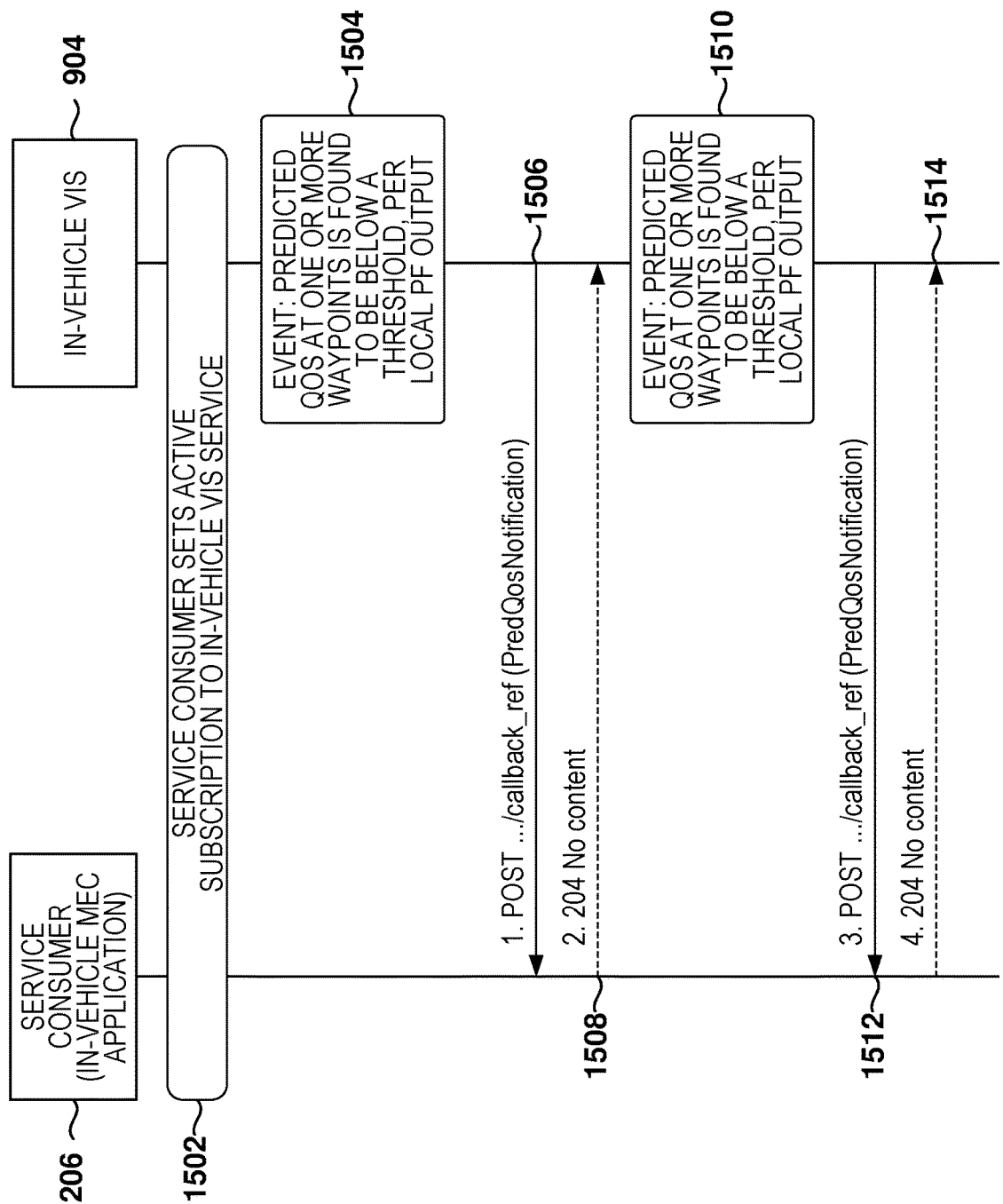
FIG. 15 illustrates the flow for receiving in-vehicle VIS event notifications on predicted QoS, according to some example embodiments.

FIG. 15 illustrates the flow for receiving in-vehicle VIS event notifications on predicted QoS, according to some example embodiments. A service consumer such as the in-vehicle MEC app 206 interacts with the in-vehicle VIS 904. At operation 1502, the in-vehicle MEC app 206 sets an active subscription with the in-vehicle VIS 904.

At operation 1504, the in-vehicle VIS is informed by the local PF of an event where the predicted PQoS is below a predetermined threshold at one or more waypoints during the journey, as identified by the local PF output. In response to detecting the event, the in-vehicle VIS 904 sends a POST request at operation 1506 with the message body containing the PredQosNotification, a data structure to the callback reference address included by the service consumer in the in-vehicle VIS predicted QoS event subscription.

In response, the in-vehicle MEC app, at operation 1508, sends a "204 No Content" response to the in-vehicle VIS 904. From that point, future events detected (at operation) 1510 with the predicted PQoS below the predetermined threshold will cause new QoS degradation notifications to the service consumer 206.

In some example embodiments, a PredQosNotification data type represents the notification from the in-vehicle VIS 904. The attributes of the PredQosNotification follow the format indicated in Table 4 below.

TABLE 4

| Name | Data type | Cardinality | Description |
| --- | --- | --- | --- |
| notificationType | String | 1 | Shall be set to "PredQosNotification". |
| timeStamp | TimeStamp | 0 . . . 1 | Time stamp. |
| qosDrop | Structure (inlined) | 1 | Remaining journey locations at which QoS reduction is predicted. |
| >qosDropPoints | Structure (inlined) | 1 . . . N | Waypoints to experience QoS reduction ordered by the sequence of visiting per the planned journey. |
| >>location | LocationInfo | 1 | Vehicular UE location. |
| >>time | TimeStamp | 0 . . . 1 | Estimated time at the location. |

TABLE 4-continued

| Name | Data type | Cardinality | Description |
|---|---|---|---|
| >>qosReduction | Uint8 | 1 | QoS reduction (e.g., in decibels for the case of received Signal-to-Noise Ratio, or, in msec for the case of end-to-end latency). |

At operation 1512, the in-vehicle VIS 904 sends a POST request to the in-vehicle MEC app 206 with the predicted QoS notification, and at operation 1514, an acknowledgement is sent in the opposite direction.

Figure 16:
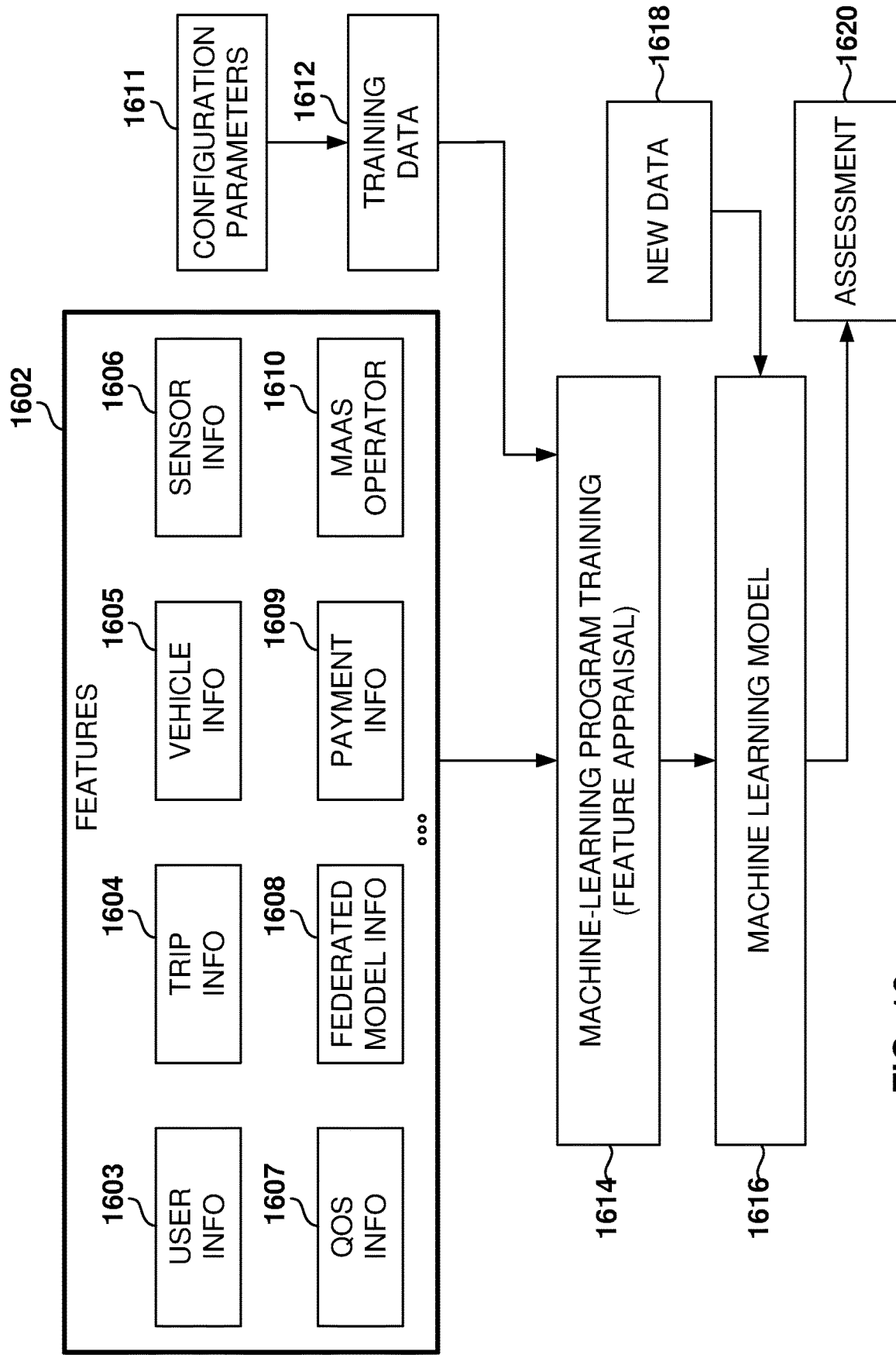
FIG. 16 illustrates the training and use of a machine-learning program, according to some example embodiments.

FIG. 16 illustrates the training and use of a machine-learning program, according to some example embodiments. In some example embodiments, machine-learning programs (MLPs), also referred to as machine-learning algorithms or tools, are utilized to perform operations associated with PQoS.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1616 from example training data 1612 in order to make data-driven predictions or decisions expressed as outputs or assessments 1620. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed.

Federated learning enables multiple actors to build a common, robust machine learning model without sharing data, thus allowing to address critical issues such as data privacy, data security, data access rights and access to heterogeneous data.

In some embodiments, example ML model 1616 provides PQoS predictions related to trip information.

The training data 1612 comprises examples of values for the features 1602. In some example embodiments, the training data comprises labeled data with examples of values for the features 1602 and labels indicating the outcome, such as trip outcome, trip demand, electric-vehicle failure, etc. The machine-learning algorithms utilize the training data 1612 to find correlations among identified features 1602 that affect the outcome. A feature 1602 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 1602 may be of different types and may include one or more of user information 1603, trip information 1604 (e.g., route, waypoints), vehicle information 1605, vehicle sensor information 1606, PQoS information 1607, federated-model information 1608, payment information 1609, MaaS operator information 1610, etc.

During training 1614, the ML algorithm analyzes the training data 1612 based on identified features 1602 and configuration parameters 1611 defined for the training. The result of the training 1614 is an ML model 1616 that is capable of taking inputs to produce assessments.

Training an ML algorithm involves analyzing large amounts of data (e.g., from several gigabytes to a terabyte or more) in order to find data correlations. The ML algorithms utilize the training data 1612 to find correlations among the identified features 1602 that affect the outcome or assessment 1620. In some example embodiments, the training data 1612 includes labeled data, which is known data for one or more identified features 1602 and one or more outcomes, such as trips delivered, vehicle sensor information, vehicle failures, beginning and ending trip locations, user information, actual demand measured, etc.

The ML algorithms usually explore many possible functions and parameters before finding what the ML algorithms identify to be the best correlations within the data; therefore, training may make use of large amounts of computing resources and time.

Many ML algorithms include configuration parameters 1611, and the more complex the ML algorithm, the more parameters there are that are available to the user. The configuration parameters 1611 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources.

When the ML model 1616 is used to perform an assessment, new data 1618 is provided as an input to the ML model 1616, and the ML model 1616 generates the assessment 1620 as output. For example, the prediction of the quality of service for a trip, demand prediction at a geographic region, user preferences, etc.

Figure 17:
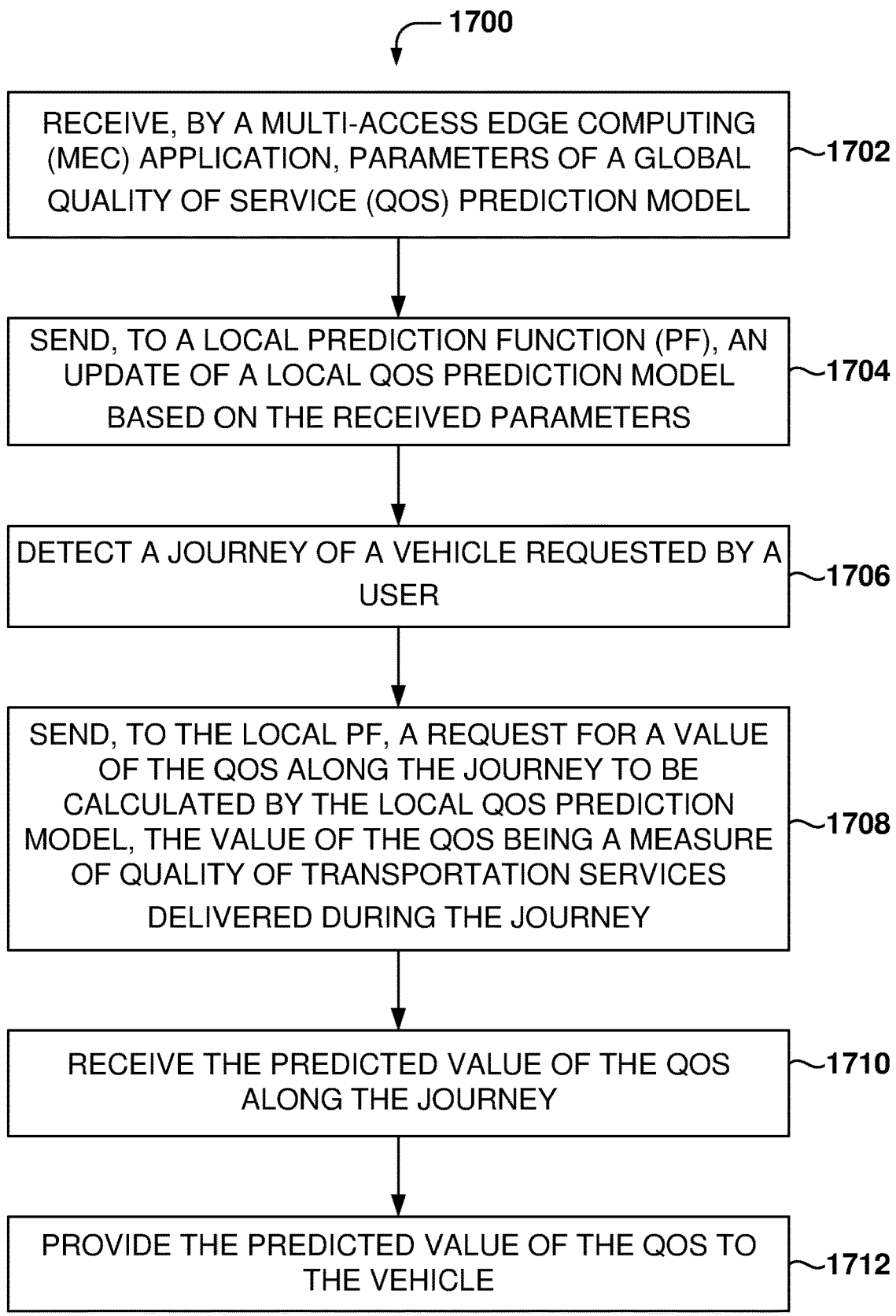
FIG. 17 is a flowchart of a method for sharing information among multiple MaaS systems for presenting service information to users, according to some example embodiments.

FIG. 17 is a flowchart of a method 1700 for sharing information among multiple MaaS systems for presenting service information to users, according to some example embodiments. While the various operations in this flowchart are presented and described sequentially, one of ordinary skill will appreciate that some or all of the operations may be executed in a different order, be combined or omitted, or be executed in parallel.

At operation 1702, a MEC application, executing in a processor (e.g., a MEC host) of a vehicle, receives parameters of a global QoS prediction model. The global QoS prediction model is a federated model utilizing information from a plurality of vehicles.

From operation 1702, the method 1700 flows to operation 1704, where the MEC application sends, to a local prediction function (PF), an update of a local QoS prediction model based on the received parameters.

From operation 1704, the method 1700 flows to operation 1706 for detecting, by the MEC application, a journey of the vehicle requested by a user.

From operation 1706, the method 1700 flows to operation 1708 for sending, by the MEC application to the local PF, a request for a value of the QoS along the journey to be calculated by the local QoS prediction model. The value of the QoS is a measure of quality of transportation services delivered during the journey.

At operation 1710, the MEC application receives the predicted value of the QoS along the journey, and at operation 1712, the MEC application provides the predicted value of the QoS to the vehicle.

In one example, the QoS prediction model is generated by utilizing federated learning to train a machine-learning program utilizing the information from the plurality of vehicles.

In one example, training data for generating the global QoS prediction model includes data from sensors collected by vehicles, data of trips taken by users, profile data of the users, and communication data for wireless communication from the vehicles.

In one example, the global QoS prediction model utilizes features comprising one or more of user information, trip information, vehicle information, sensor information, and transportation provider information.

In one example, the method 1700 further comprises collecting data from sensors in the vehicle, and forwarding the collected data from the sensors to a central MEC application.

In one example, the method 1700 further comprises detecting, by the in-vehicle MEC application, that accuracy of the local QoS prediction model is below a predetermined threshold; and requesting, via the central MEC application, updated parameters of the global QoS prediction model.

In one example, the parameters of the global QoS prediction model are calculated by a central prediction function (PF), and the method 1700 further comprises receiving, by the in-vehicle MEC application, a second value of the QoS prediction model calculated by the central PF; and causing presentation, by the in-vehicle MEC application, of the second value of the QoS on the display of the vehicle.

In one example, the method 1700 further comprises collecting, by the in-vehicle MEC application, journey information from a mobile device of a user; and updating information for predicting the value of the QoS based on the collected information from the mobile device.

In yet another general aspect, a machine-readable storage medium (e.g., a non-transitory storage medium) includes instructions that, when executed by a machine, cause the machine to perform operations comprising: receiving, by a multi-access edge computing (MEC) application executing in a processor of a vehicle, parameters of a global quality of service (QoS) prediction model, the global QoS prediction model being a federated model utilizing information from a plurality of vehicles; updating, by the in-vehicle MEC application, a local QoS prediction model based on the received parameters; detecting, by the in-vehicle MEC application, a journey of the vehicle requested by a user; predicting, by the local QoS prediction model, a QoS along the journey; and causing presentation, by the in-vehicle MEC application, of the predicted QoS on a display of the vehicle.

Another general aspect is for a system that includes a memory comprising instructions and one or more computer processors. The instructions, when executed by the one or more computer processors, cause the one or more computer processors to perform operations comprising: receiving, by a multi-access edge computing (MEC) application executing in a processor of a vehicle, parameters of a global quality of service (QoS) prediction model, the global QoS prediction model being a federated model utilizing information from a plurality of vehicles; updating, by the in-vehicle MEC application, a local QoS prediction model based on the received parameters; detecting, by the in-vehicle MEC application, a journey of the vehicle requested by a user; predicting, by the local QoS prediction model, a QoS along the journey; and causing presentation, by the in-vehicle MEC application, of the predicted QoS on a display of the vehicle.

Another general aspect is for a system that includes means for receiving parameters of a global quality of service (QoS) prediction model, the global QoS prediction model being a federated model utilizing information from a plurality of vehicles; means for updating, a local QoS prediction model based on the received parameters; means for detecting a journey of the vehicle requested by a user; predicting, by the local QoS prediction model, a QoS along the journey; and means for causing presentation of the predicted QoS on a display of the vehicle.

In yet another general aspect, a system comprises: means for receiving, by a local prediction function (PF), parameters of a global quality of service (QoS) prediction model and an update of a local QoS prediction model; means for receiving, by the local PF from a multi-access edge computing (MEC) application, a request for a value of the QoS along a journey of a vehicle requested by a user; means for predicting, utilizing the local QoS prediction model at the local PF, the value of the QoS along the journey of the vehicle, the value of the QoS being a measure of quality of transportation services delivered during the journey of the vehicle; and means for sending, by the local PF to the MEC application, the predicted value of the QoS along the journey.

The benefits of using the federated PQoS model include:
1. Exploiting a plethora of hardware and software assets to enable interoperable MaaS services in heterogeneous C-V2X scenarios.
2. Providing a EC standard-based solution, with the double benefit of detectability and also wide adoption in the market.

Figure 18:
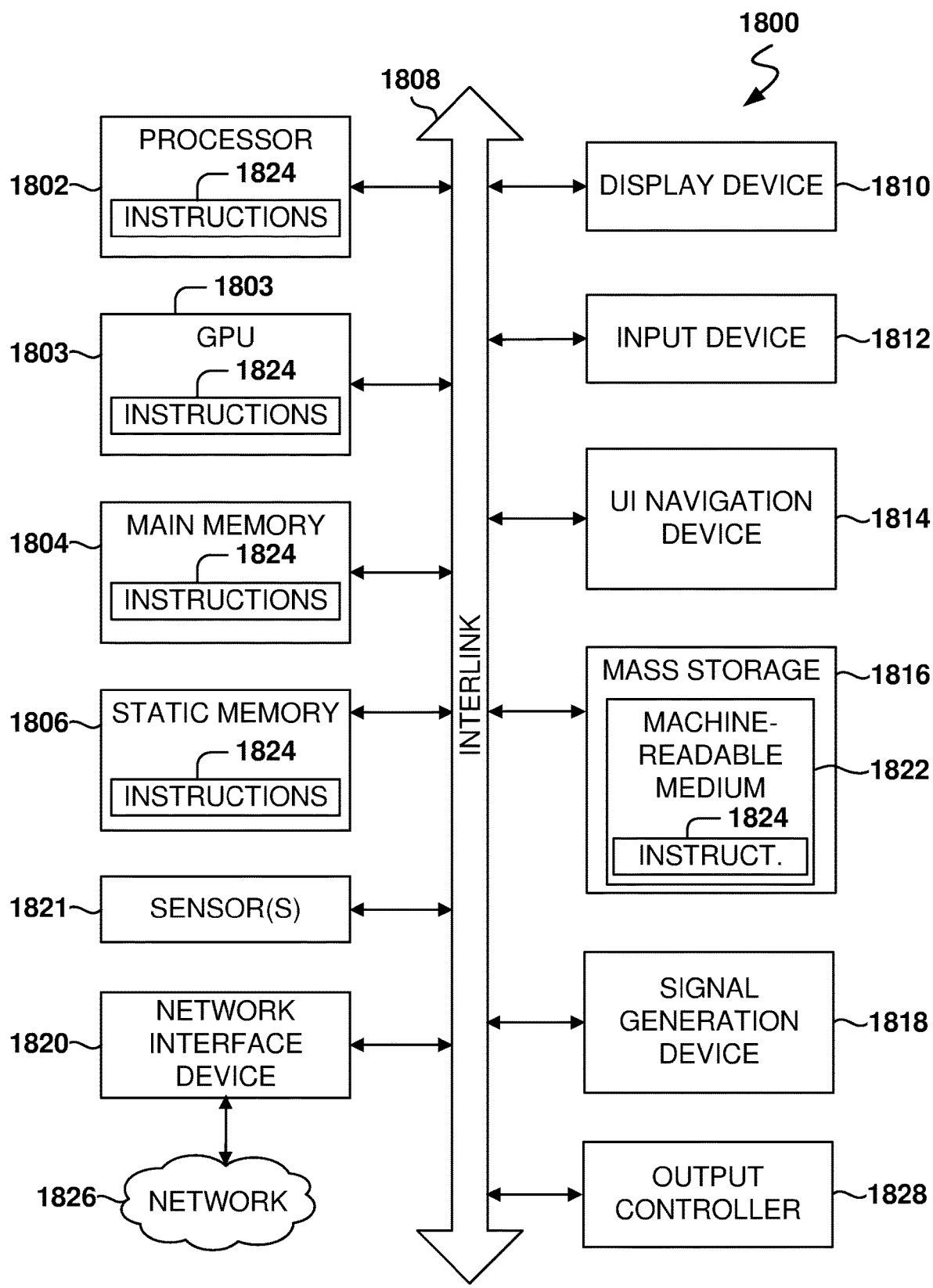
FIG. 18 is a block diagram illustrating an example of a machine upon or by which one or more example process embodiments described herein may be implemented or controlled.

FIG. 18 is a block diagram illustrating an example of a machine 1800 upon or by which one or more example process embodiments described herein may be implemented or controlled. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in a peer-to-peer (P2P) (or other distributed) network environment. Further, while only a single machine 1800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1800 may include a hardware processor 1802 (e.g., a central processing unit (CPU), a hardware processor core, or any combination thereof), a graphics processing unit (GPU) 1803, a main memory 1804, and a static memory 1806, some or all of which may communicate with each other via an interlink (e.g., bus) 1808. The machine 1800 may further include a display device 1810, an alphanumeric input device 1812 (e.g., a keyboard), and a user interface (UI) navigation device 1814 (e.g., a mouse). In an example, the display device 1810, alphanumeric input device 1812, and UI navigation device 1814 may be a touch screen display. The machine 1800 may additionally include a mass storage device (e.g., drive unit) 1816, a signal generation device 1818 (e.g., a speaker), a network interface device 1820, and one or more sensors 1821, such as a Global Positioning System (GPS) sensor, compass, accelerometer, or another sensor. The machine 1800 may include an output controller 1828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1816 may include a machine-readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within the static memory 1806, within the hardware processor 1802, or within the GPU 1803 during execution thereof by the machine 1800. In an example, one or any combination of the hardware processor 1802, the GPU 1803, the main memory 1804, the static memory 1806, or the mass storage device 1816 may constitute machine-readable media.

While the machine-readable medium 1822 is illustrated as a single medium, the term "machine-readable medium" may include a single medium, or multiple media, (e.g., a centralized or distributed database, and/or associated caches and servers) configured to store the one or more instructions 1824.

The term "machine-readable medium" may include any medium that is capable of storing, encoding, or carrying instructions 1824 for execution by the machine 1800 and that cause the machine 1800 to perform any one or more of the techniques of the present disclosure, or that is capable of storing, encoding, or carrying data structures used by or associated with such instructions 1824. Non-limiting machine-readable medium examples may include solid-state memories, and optical and magnetic media. In an example, a massed machine-readable medium comprises a machine-readable medium 1822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1824 may further be transmitted or received over a communications network 1826 using a transmission medium via the network interface device 1820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
means for receiving, by a multi-access edge computing (MEC) application, parameters of a global quality of service (QoS) prediction model;
means for sending, by the MEC application to a local prediction function (PF), an update of a local QoS prediction model based on the received parameters;
means for detecting, by the MEC application, a journey of a vehicle requested by a user;
means for sending, by the MEC application to the local PF, a request for a value of the QoS along the journey to be calculated by the local QoS prediction model, the value of the QoS being a measure of quality of transportation services delivered during the journey;
means for receiving, by the MEC application, the predicted value of the QoS along the journey; and
means for providing, by the MEC application, the predicted value of the QoS to the vehicle.

2. The system as recited in claim 1, wherein the global QoS prediction model is generated utilizing federated learning to train a machine-learning program utilizing information from a plurality of vehicles.

3. The system as recited in claim 1, wherein training data for generating the global QoS prediction model includes data from sensors collected by vehicles, data of trips taken by users, profile data of the users, and communication data for wireless communication from the vehicles.

4. The system as recited in claim 1, wherein the global QoS prediction model utilizes features comprising one or more of user information, trip information, vehicle information, sensor information, and transportation provider information.

5. The system as recited in claim 1, further comprising:
means for collecting, by the MEC application, data from sensors in the vehicle; and
means for forwarding, by the MEC application, the collected data from the sensors to a central MEC application.

6. The system as recited in claim 5, further comprising:
means for detecting, by the MEC application, that accuracy of the local QoS prediction model is below a predetermined threshold; and
means for requesting, via the central MEC application, updated parameters of the global QoS prediction model.

7. The system as recited in claim 1, wherein the parameters of the global QoS prediction model are calculated by a central prediction function (PF), the system further comprising:
means for receiving, by the MEC application, a second value of the QoS prediction model calculated by the central PF; and
means for causing presentation, by the MEC application, of the second value of the QoS on a display of the vehicle.

8. The system as recited in claim 1, further comprising:
means for collecting, by the MEC application, journey information from a mobile device of the user; and
means for updating information for predicting the value of the QoS based on the collected information from the mobile device.

9. A non-transitory machine-readable storage medium including instructions for a multi-access edge computing (MEC) application that, when executed by a machine, cause the machine to perform operations comprising: receiving parameters of a global quality of service (QoS) prediction model; sending, to a local prediction function (PF), an update of a local QoS prediction model based on the received parameters; detecting a journey of a vehicle requested by a user; sending, to the local PF, a request for a value of the QoS along the journey to be calculated by the local QoS prediction model, the value of the QoS being a measure of quality of transportation services delivered during the journey; receiving the predicted value of the QoS along the journey; and providing the predicted value of the QoS to the vehicle.

10. The non-transitory machine-readable storage medium as recited in claim 9, wherein the global QoS prediction model is generated by utilizing federated learning to train machine-learning program utilizing information from a plurality of vehicles.

11. The non-transitory machine-readable storage medium as recited in claim 9, wherein training data for generating the global QoS prediction model includes data from sensors collected by vehicles, data of trips taken by users, profile data of the users, and communication data for wireless communication from the vehicles.

12. The tangible non-transitory machine-readable storage medium as recited in claim 9, wherein the global QoS prediction model utilizes features comprising one or more of user information, trip information, vehicle information, sensor information, and transportation provider information.

13. The non-transitory machine-readable storage medium as recited in claim 9, wherein the machine further performs operations comprising: collecting data from sensors in the vehicle; and forwarding the collected data from the sensors to a central MEC application.

14. The non-transitory machine-readable storage medium as recited in claim 9, wherein the machine further performs operations comprising: detecting that accuracy of the local QoS prediction model is below a predetermined threshold; and requesting updated parameters of the global QoS prediction model.

15. The tangible non-transitory machine-readable storage medium as recited in claim 9, wherein the parameters of the global QoS prediction model are calculated by a central prediction function (PF), wherein the machine further performs operations comprising: receiving a second value of the QoS calculated by the central PF; and causing presentation of the second value of the QoS on a display of the vehicle.

16. The non-transitory machine-readable storage medium as recited in claim 9, wherein the machine further performs operations comprising: collecting journey information from a mobile device of a user; and updating information for predicting the value of the QoS based on the collected information from the mobile device.

17. A system comprising:
 a memory comprising instructions for a multi-access edge computing (MEC) application; and
 one or more computer processors, wherein the instructions, when executed by the one or more computer processors, cause the system to perform operations comprising:
  receiving parameters of a global quality of service (QoS) prediction model;
  sending, to a local prediction function (PF), an update of a local QoS prediction model based on the received parameters;
  detecting a journey of a vehicle requested by a user;
  sending, to the local PF, a request for a value of the QoS along the journey to be calculated by the local QoS prediction model, the value of the QoS being a measure of quality of transportation services delivered during the journey;
  receiving the predicted value of the QoS along the journey; and
  providing the predicted value of the QoS to the vehicle.

18. The system as recited in claim 17, wherein the global QoS prediction model is generated by utilizing federated learning to train a machine-learning program utilizing information from a plurality of vehicles.

19. The system as recited in claim 17, wherein training data for generating the global QoS prediction model includes data from sensors collected by vehicles, data of trips taken by users, profile data of the users, and communication data for wireless communication from the vehicles.

20. The system as recited in claim 17, wherein the global QoS prediction model utilizes features comprising one or more of user information, trip information, vehicle information, sensor information, and transportation provider information.

21. A system comprising:
 means for receiving, by a local prediction function (PF), parameters of a global quality of service (QoS) prediction model and an update of a local QoS prediction model;
 means for receiving, by the local PF from a multi-access edge computing (MEC) application, a request for a value of the QoS along a journey of a vehicle requested by a user;
 means for predicting, utilizing the local QoS prediction model at the local PF, the value of the QoS along the journey of the vehicle, the value of the QoS being a measure of quality of transportation services delivered during the journey of the vehicle; and
 means for sending, by the local PF to the MEC application, the predicted value of the QoS along the journey.

* * * * *

UNITED STATES PATENT AND TRADEMARK OFFICE
CERTIFICATE OF CORRECTION

PATENT NO. : 12,045,738 B2
APPLICATION NO. : 17/132469
DATED : July 23, 2024
INVENTOR(S) : Sabella et al.

Page 1 of 1

It is certified that error appears in the above-identified patent and that said Letters Patent is hereby corrected as shown below:

In the Claims

In Column 28, Line 56, in Claim 12, after "The", delete "tangible"

In Column 29, Line 5, in Claim 15, after "The", delete "tangible"

Signed and Sealed this
Second Day of September, 2025

Coke Morgan Stewart
*Acting Director of the United States Patent and Trademark Office*